US010047976B2

(12) United States Patent
Creamer

(10) Patent No.: US 10,047,976 B2
(45) Date of Patent: *Aug. 14, 2018

(54) CENTRIFUGAL REFRIGERANT VAPOUR COMPRESSORS

(71) Applicant: VENUS SYSTEMS LIMITED, St. Peter Port, Guernsey (GB)

(72) Inventor: Michael Creamer, Waterlooville (GB)

(73) Assignee: Venus Systems Limited, St. Peter Port (GB)

(*) Notice: Subject to any disclaimer, the term of this patent is extended or adjusted under 35 U.S.C. 154(b) by 0 days.

This patent is subject to a terminal disclaimer.

(21) Appl. No.: 15/591,846

(22) Filed: May 10, 2017

(65) Prior Publication Data

US 2017/0248346 A1 Aug. 31, 2017

Related U.S. Application Data

(63) Continuation of application No. 14/368,280, filed as application No. PCT/GB2012/053211 on Dec. 20, 2012, now Pat. No. 9,671,139.

(30) Foreign Application Priority Data

Dec. 21, 2011 (GB) .................................. 1122142.1

(51) Int. Cl.
F04D 25/06 (2006.01)
F25B 1/10 (2006.01)
(Continued)

(52) U.S. Cl.
CPC ............... F25B 1/10 (2013.01); F04C 18/02 (2013.01); F04C 18/0207 (2013.01);
(Continued)

(58) Field of Classification Search
None
See application file for complete search history.

(56) References Cited

U.S. PATENT DOCUMENTS 3,650,634 A * 3/1972 Osborne ................. F04D 25/02
277/431
4,494,386 A * 1/1985 Edwards ................ C09K 5/041
62/402

(Continued)

FOREIGN PATENT DOCUMENTS

DE 39 40 027 A1 8/1990
EP 0 318 638 A2 6/1989
(Continued)

Primary Examiner — Isaac T Tecklu
(74) Attorney, Agent, or Firm — Seed Intellectual Property Law Group LLP

(57) ABSTRACT

A centrifugal compressor for compressing a refrigerant vapor in a refrigeration cycle. The compressor comprises an impeller drive shaft supported by first and second radial bearings for rotation within the compressor housing and an impeller assembly including at least one centrifugal impeller wheel mounted on the impeller drive shaft to rotate with the impeller drive shaft. The first and second radial bearings are hydrodynamic fluid bearings in which the bearing fluid is the refrigerant vapor. The compressor further comprises a conduit for supplying a portion of the refrigerant vapor from the impeller assembly to the first and second fluid bearings.

34 Claims, 18 Drawing Sheets

(51) Int. Cl.

| | | |
|---|---|---|
| *F04D 29/057* | (2006.01) | |
| *F25B 1/053* | (2006.01) | |
| *F25B 29/00* | (2006.01) | |
| *F25B 31/00* | (2006.01) | |
| *F16C 33/10* | (2006.01) | |
| *F04D 29/063* | (2006.01) | |
| *F04C 18/02* | (2006.01) | |
| *F04D 17/12* | (2006.01) | |
| *F04D 27/00* | (2006.01) | |
| *F25B 1/00* | (2006.01) | |
| *F25B 49/02* | (2006.01) | |
| *F04D 29/58* | (2006.01) | |
| *G05D 23/19* | (2006.01) | |
| *F04D 29/051* | (2006.01) | |
| *F04D 29/053* | (2006.01) | |
| *F04D 29/28* | (2006.01) | |
| *F04D 29/46* | (2006.01) | |
| *F25B 43/00* | (2006.01) | |
| *G05B 13/02* | (2006.01) | |
| *F24F 11/30* | (2018.01) | |
| *F24F 11/62* | (2018.01) | |
| *F24F 11/63* | (2018.01) | |
| *F24F 11/46* | (2018.01) | |

(52) U.S. Cl.
CPC ........... *F04D 17/12* (2013.01); *F04D 17/122* (2013.01); *F04D 25/06* (2013.01); *F04D 27/001* (2013.01); *F04D 27/007* (2013.01); *F04D 29/051* (2013.01); *F04D 29/053* (2013.01); *F04D 29/057* (2013.01); *F04D 29/063* (2013.01); *F04D 29/284* (2013.01); *F04D 29/462* (2013.01); *F04D 29/5806* (2013.01); *F16C 33/1005* (2013.01); *F24F 11/30* (2018.01); *F24F 11/62* (2018.01); *F25B 1/00* (2013.01); *F25B 1/053* (2013.01); *F25B 29/003* (2013.01); *F25B 31/002* (2013.01); *F25B 43/003* (2013.01); *F25B 49/022* (2013.01); *G05B 13/024* (2013.01); *G05D 23/1917* (2013.01); *F16C 2210/00* (2013.01); *F16C 2362/52* (2013.01); *F24F 11/46* (2018.01); *F24F 11/63* (2018.01); *F25B 2400/01* (2013.01); *F25B 2400/23* (2013.01); *F25B 2500/26* (2013.01); *F25B 2700/171* (2013.01); *G05B 2219/2614* (2013.01)

(56) References Cited

U.S. PATENT DOCUMENTS

| | | | | |
|---|---|---|---|---|
| 4,686,834 | A | * | 8/1987 | Haley .................... F04D 27/02 62/209 |
| 5,031,690 | A | * | 7/1991 | Anderson ............ B60H 1/3226 165/43 |
| 2004/0179947 | A1 | * | 9/2004 | Agrawal ................. F04D 17/12 417/212 |
| 2008/0098768 | A1 | * | 5/2008 | Masoudipour ........ F25B 31/006 62/505 |
| 2008/0199326 | A1 | * | 8/2008 | Masoudipour ........ F04D 29/584 417/247 |
| 2009/0044548 | A1 | * | 2/2009 | Masoudipour ........ F04D 17/122 62/115 |
| 2009/0205360 | A1 | * | 8/2009 | Haley .................. F04D 17/122 62/498 |
| 2009/0311089 | A1 | * | 12/2009 | Begin .................... F03B 11/06 415/104 |
| 2010/0186604 | A1 | * | 7/2010 | Otake .................. F25B 29/003 99/455 |
| 2010/0307191 | A1 | * | 12/2010 | Sommer .................. F25B 1/10 62/505 |

FOREIGN PATENT DOCUMENTS

| | | | |
|---|---|---|---|
| EP | 2 012 019 A2 | 1/2009 | |
| EP | 2 108 798 A2 | 10/2009 | |
| JP | 2004-44954 A | 2/2004 | |
| WO | 2007/010186 A1 | 1/2007 | |
| WO | 2007/041818 A1 | 4/2007 | |
| WO | WO 2007041818 A1 * | 4/2007 | ........... F04D 29/052 |
| WO | 2007/121086 A2 | 10/2007 | |

* cited by examiner

Key

HP-SHT-VS : High Pressure Superheated Vapour Supply
SAT-VS : Saturated Vapour Supply
SHT-VS : Superheated Vapour Supply
LLS : Liquid Level Sensor
HTR : Heater
HP-LF : High Pressure Liquid Feed
TS : Temperature Sensor
SV : Solenoid Valve
INS : Insulation
SL : Saturated Liquid
SV : Saturated Vapour Key HP-SHT-VS : High Pressure Superheated Vapour Supply
LLS : Liquid Level Sensor
HTR : Heater (Electric)
HP-VF : High Pressure Vapour Feed
TS : Temperature Sensor
EOV : Electrically Operated Valve
INS : Insulation
SHT-V : Super Heated Vapour

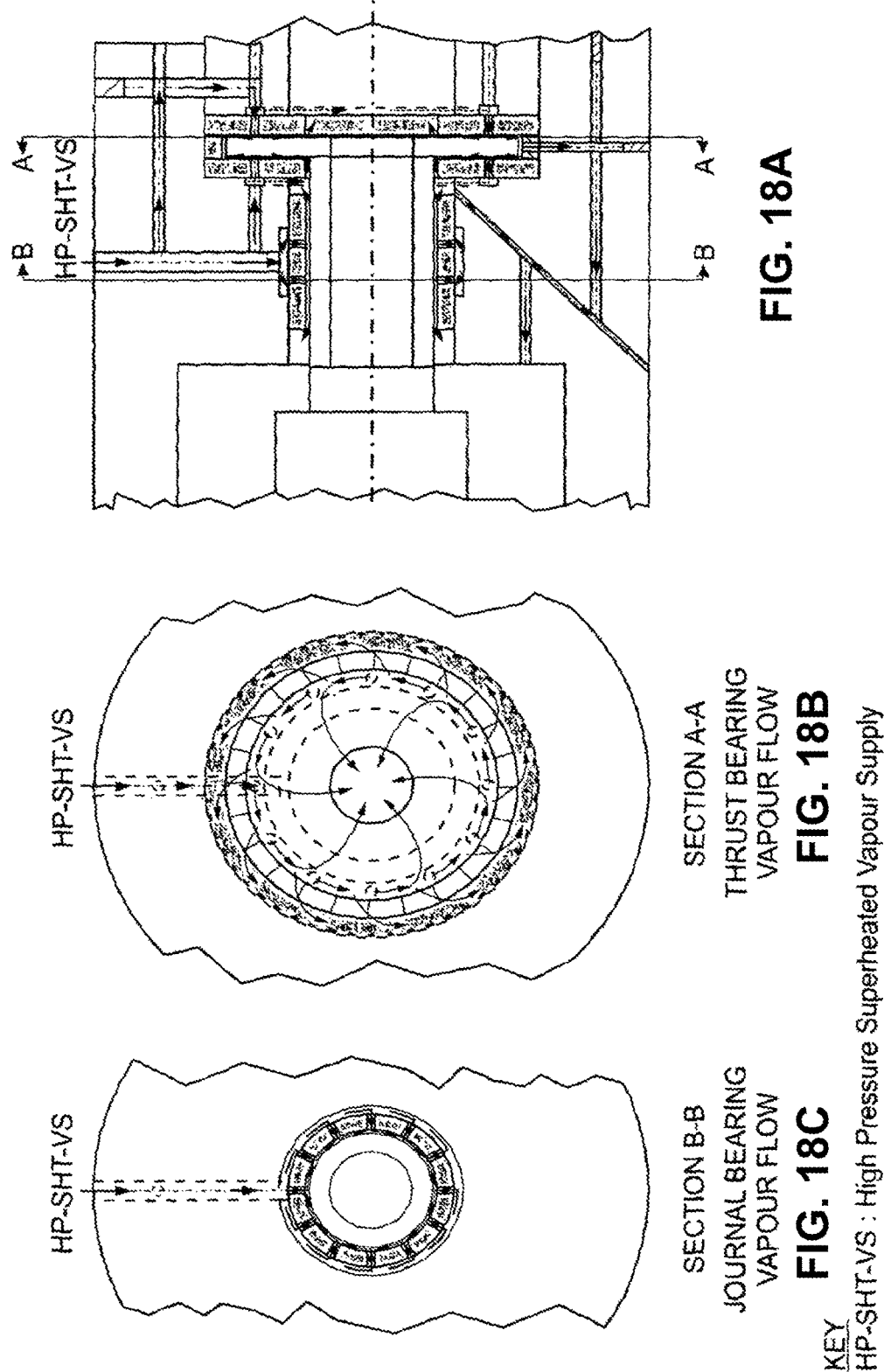

CENTRIFUGAL REFRIGERANT VAPOUR COMPRESSORS

TECHNICAL FIELD

This invention relates to centrifugal vapour compressors, in particular, although not necessarily exclusively, electrically driven (e.g., electric motor driven) centrifugal vapour compressors. Compressors in accordance with embodiments of the present invention are particularly suitable for use in refrigeration circuits and systems, such as those in air conditioning, direct expansion (DX) chilled water and other cooling systems, as well as for refrigerators (e.g., commercial refrigerators) and industrial process cooling.

DESCRIPTION OF THE RELATED ART

Chilled water and DX systems are commonly used for air conditioning in commercial buildings. They are also used for process cooling and other numerous applications. They generally include at least one refrigeration circuit to provide chilled water or air that is then used in heat exchangers to cool air recirculating within terminal units or the air conditioning duct work within buildings.

A typical refrigeration circuit for such applications uses a circulating refrigerant fluid and operates on a vapour-compression refrigeration cycle. The refrigerant enters a compressor in a superheated vapour state and is compressed to a higher pressure, raising the saturation temperature of the refrigerant vapour at the same time. Superheated vapour from the compressor discharge outlet passes to a condenser, where it is cooled, de-superheated and the vapour then condenses to a saturated liquid and then to a sub-cooled liquid. In air conditioning systems in buildings, the heat rejected from the refrigerant as it condenses to a liquid state is usually carried away by ambient air. The sub-cooled liquid refrigerant output from the condenser is next passed through an expansion device, where it undergoes an abrupt reduction in pressure, resulting in an adiabatic flash evaporation of a proportion of the liquid refrigerant. This dramatically lowers the saturation temperature of the remaining liquid refrigerant, which now becomes a liquid and vapour mixture. The refrigerant mixture then passes to an evaporator, through which the water or air to be chilled flows. The liquid part of the cold liquid/vapour refrigerant mixture evaporates and in so doing removes heat from the circulating water or air to chill it. Superheated refrigerant vapour from the evaporator outlet then returns to the compressor inlet and the cycle starts again.

Various types of compressor have been used for refrigeration circuits, including rotary, screw, scroll, reciprocating and centrifugal compressors.

Of the available compressor types, centrifugal compressors have proved popular over many years as they operate with a simple, continuous rotary motion, with relatively few moving parts, have proved to be reliable and require little maintenance. Whilst the compression ratios achieved in known centrifugal compressors (typically about 3:1 to 4:1) are not as high as can be achieved with other types of compressors, the pressure rise and consequent temperature rises achieved are adequate for the conventional applications they are used for.

In most known centrifugal compressors, as well as other compressor types, oil is added to the recirculating refrigerant to lubricate the compressor bearings (or other moving parts). The oil must be carefully chosen so as not to react adversely with the refrigerant and must circulate freely with the refrigerant; a change in refrigerant type will usually require a change of the oil.

The refrigeration system must also be carefully designed to ensure that oil circulating with the refrigerant returns to the compressor, either by flowing around the complete system and returning by velocity entrainment, gravity and/or appropriate routing/sizing of the pipework, or an oil separator can be positioned at the outlet of the compressor and a separate return path provided for the oil to return it to the compressor from the oil separator.

More recently, to avoid the complexities associated with oil lubrication, oil-free centrifugal compressors have been proposed.

One example of an oil-free compressor is the Danfoss Turbocor™ compressor, which is a two-stage centrifugal compressor that uses magnetic bearings. These magnetic bearings require a complex control system to ensure that they operate correctly and fail-safe if there is a loss of electrical power.

US2004179947 describes another example of an oil-free centrifugal compressor, in this case using foil vapour journal bearings (sometimes referred to as "dynamic" or "hydrodynamic" gas bearings) to support the rotating shaft of the compressor, where the rotary motion of the shaft within the bearing itself generates the pressure in the vapour necessary to support the shaft. WO 00/55506 and WO 94/295597 describe further examples of centrifugal refrigerant compressors that use radial dynamic gas bearings, in which the refrigerant itself is used as the bearing fluid.

JP2004044954 describes a single stage refrigerant compressor that employs hydrostatic radial bearings, i.e., externally pressurised bearings, in which the bearing fluid is the refrigerant itself. At normal running speeds a portion of refrigerant vapour from the compressor vapour outlet is supplied to the bearings to provide the necessary pressurised flow to float the bearings. At low compressor speeds, the bearings are pressurised instead with a supply of refrigerant vapour from an accumulator. U.S. 2009/311089 describes another example of a compressor that includes hydrostatic radial bearings.

Recently, there has been a growing desire to use the heat rejected from the refrigeration cycle of chilled water and DX systems to do some useful work, for example, to provide hot water. Typical hot water temperature from a commercial/industrial boiler is 82° C. Conventional refrigeration systems, on the other hand, including those using the types of oil-free centrifugal compressors referred to above, are capable of generating hot water from rejected heat energy normally at no more than about 50-55° C. This is due to their inability to develop sufficiently high compression ratios. It would therefore be necessary to use an auxiliary heat energy source (oil or gas fired boiler) to raise the water temperature to the desired 82° C.

BRIEF SUMMARY

The present invention is generally concerned with providing an improved centrifugal refrigerant compressor that can ameliorate one or more of the problems associated with known compressors.

A general aim of some embodiments of the invention is to provide a centrifugal compressor that can be used in a chilled water system to provide chilled water at 5° C. or lower and hot water at up to 82° C. or higher without the need for an auxiliary heat energy supply.

In a first aspect, the present invention provides a centrifugal compressor for compressing a refrigerant vapour in a refrigeration cycle, the compressor comprising:
- an impeller drive shaft supported by first and second radial bearings for rotation within the compressor housing; and
- an impeller assembly including at least one centrifugal impeller wheel mounted on the impeller drive shaft to rotate with the impeller drive shaft;
- wherein the first and second radial bearings are hydrodynamic fluid bearings in which the bearing fluid is the refrigerant vapour, the compressor further comprising a conduit for supplying a portion of the refrigerant vapour from the impeller assembly to the first and second fluid bearings.

Fluid bearings are bearings that support the load they are carrying solely on a thin layer of fluid (i.e., liquid or vapour/gas) in a bearing gap between opposed bearing surfaces of an inner bearing part secured to the impeller drive shaft and an outer bearing part secured to a support structure, e.g., a compressor housing, spaced from and surrounding the shaft. In the present case, the fluid is a vapour, i.e., the refrigerant vapour itself.

The hydrodynamic fluid bearings of this aspect of the present invention are self-supporting and do not require any external pressurisation to float the bearings at normal operating speeds. However, the provision of a conduit to supply a portion of vapour from the impeller assembly to the bearings can be used to maintain a flow of vapour through the bearings even at normal operating speeds at which the bearings are self-supporting. This is advantageous because it can help to prevent the ingress of dirt and, in cases where it may be necessary or desirable, can also assist with cooling of the bearings. This type of hydrodynamic bearing with a supply of a portion of the vapour from the impeller assembly (or an external source) is referred to at times in the following description as a "hybrid" bearing.

The compressor will typically also include a housing surrounding the drive shaft. The compressor may further comprise a motor for driving the rotation of the impeller drive shaft. The motor may be mounted within compressor housing.

In some embodiments, the conduit through which a portion of vapour is supplied from the impeller assembly to the bearings will be a passage formed in the compressor housing. The passage may terminate at each bearing adjacent the outer part of the bearing, vapour being fed into the gap between the two bearing surfaces via one or more holes extending through the outer part of the bearing. The passage may terminate, for example, in an annular channel around the outer periphery of the outer bearing part, in which case there are preferably multiple holes spaced around the channel, each hole extending through the outer bearing part from this channel to the bearing gap. The holes are preferably equally spaced. There are preferably four or more holes.

Alternatively or additionally, the partial feed of vapour from the impeller assembly to one or more of the bearings may be supplied through a conduit in the impeller drive shaft and injected into the bearing gap through holes in the inner bearing part.

By using a fluid hybrid bearing in accordance with embodiments of the present invention, there is no need for an oil lubricant, and the compatibility problems between oil and refrigerants are avoided. This potentially opens up opportunities for using refrigerants that have not typically been used in the past. The use of the refrigerant itself, vapour or liquid, to float the bearings simplifies the design and avoids the need for a separate supply of bearing fluid.

Moreover, complex and costly components such as oil pumps, oil separators, oil filters, oil level controls, compressor crankcase heaters and oil separator heaters are totally eliminated, together with the risk of failure or system shut-down in the event of an oil system malfunction. The presence of moisture (water vapour) in modern, highly hygroscopic oils, combined with refrigerant, can lead to acid formation, which then goes on to attack drive motor windings and causes copper plating on high temperature parts. Thus, the complete elimination of oil within the refrigeration system eliminates these problems, a frequent cause of compressor/system failures. The absence of oil also makes it far easier to retrofit a new refrigerant, because there is no need to consider compatibility between oils and new refrigerants.

As noted already above, the radial bearings in embodiments of the invention are hydrodynamic bearings, where at normal operating speeds the rotary motion of the shaft within the bearing itself generates the pressure in the vapour necessary to support the shaft. The bearing surfaces facing the rotating shaft are typically grooved (and generally must be where the bearing fluid is vapour, as in the present case) to improve the stability and reliability of the bearings and to ensure adequate load capacity and stiffness at high speed. The grooves are angled to the direction of rotation and are typically spiral grooves.

In accordance with this aspect of the present invention, and in contrast to the prior art referred to above, the hydrodynamic (i.e., self-supporting) fluid bearings of embodiments of the present invention are supplied with pressurised refrigerant vapour from at least one centrifugal impeller wheel (although some embodiments of other aspects of the invention may not have a supply of vapour from the impeller wheels).

By providing a supply of pressurised vapour to the bearings from the impeller wheel it is possible to minimise the time at start-up of the compressor during which the bearings are not floating because they have not yet reached a speed at which the pressure created by their rotation is sufficient to support the gravitational load of the shaft. Especially if the vapour supply is from a high pressure region of an impeller wheel, once the impeller starts to rotate, it can provide a pressurised supply of refrigerant vapour to the bearings to augment the pressure that is generated by the rotation of the hydrodynamic bearing itself.

At least one impeller wheel of the impeller assembly will generally have a plurality of blades, and an impeller casing around the impeller wheel, the impeller blades and impeller casing defining flow passages for the refrigerant vapour through the impeller assembly.

In accordance with another aspect of the invention there is provided a method of switching on and rotating the shaft of a compressor comprising the steps of: displacing a compressor shaft from a static (rest) position to a raised (active) position using a hydrodynamic bearing by introducing a volume flow rate of vapour, preferably at a given pressure, through the bearing in order to create a lift force between the bearing surfaces.

The vapour may be in a superheated vapour state under high pressure, a saturated liquid arranged to boil into a saturated vapour or a superheated vapour state that expands rapidly on contact with components of the hydrodynamic bearing and/or shaft so as to generate sufficient force to lift the shaft off an inner surface of the centrifugal compressor bearing surfaces.

Once the shaft reaches operational speed, a self-supporting dynamic equilibrium is established, as described below.

It is understood that the invention also provides a method of switching off a compressor comprising the steps of: lowering a compressor shaft by controlling the flow of gas, via an outlet, so as to remove any lift effect provided by the gas and thereby bring the shaft into contact with the surfaces of the bearings.

Once the rotary speed of the compressor is sufficient for the hydrodynamic bearings to be self-supporting, the supply of refrigerant vapour from an impeller wheel is no longer required and it could be switched off (and in some embodiments is). In preferred embodiments of the invention, however, the supply of refrigerant vapour from the impeller wheel is maintained. This has the advantage of maintaining a flow of refrigerant vapour through the bearing, which can serve to inhibit the ingress of dirt (or to flush dirt from the bearing) and can also serve to cool the bearing, if required. This vapour flow may be continuous throughout operation of the compressor. Alternatively it may be switched on and off (e.g., by operation of a valve) intermittently, for example, to provide a flow of vapour to cool the bearings only when an increase in bearing temperature above a predetermined threshold is detected.

The supply pressure from the impeller wheel required to maintain a steady flow of vapour through the bearings once the compressor is up to speed is not as high as the pressure required (or at least desired) to help float the bearings at start-up and low speeds. In some embodiments, therefore, a refrigerant vapour feed is taken from two (or more) different regions of the wheel or wheels of the impeller assembly, including a relatively low pressure region and a relatively high pressure region, and the compressor further comprises a valve arrangement for selectively connecting either the higher pressure region or the lower pressure region of the impeller wheel(s) to the conduit that supplies refrigerant vapour to the radial bearings (and in some embodiments also the thrust bearing). In this way, refrigerant vapour can be supplied from a higher pressure region of the impeller assembly during slow speed running, e.g., at start-up and shut-down, and once the compressor is up to speed and the hydrodynamic bearings are self-supporting, the supply can be switched to supply refrigerant vapour from the lower pressure region of the impeller wheel(s), to maintain a flow of vapour through the bearings for cooling and inhibition of dirt ingress.

By using multiple vapour tappings, for example, three or four or more, at different pressure regions of the impeller wheel(s), with an appropriate valve arrangement to selectively supply vapour from the tappings, one at a time to the radial bearings, the pressure of the supply of refrigerant vapour can be selected based on the speed of rotation of the shaft (higher pressure for lower speeds and lower pressure for higher speeds). Through appropriate control of such an arrangement, the resistance of the bearing itself may be adequate to regulate the flow of the refrigerant vapour, avoiding any need for a separate flow regulating orifice.

Where the pressurisation of the bearings is achieved using refrigerant vapour from the impeller arrangement or within the bearings themselves in hydrodynamic bearings, or a combination of the two, there will inevitably be periods at start-up, when the compressor starts from zero speed, and at shut-down, when the compressor slows down to a stop, when there is contact between the shaft and the bearing surface facing the shaft. Although the wear resulting from these periods of contact is likely to be minimal, it may be desirable in some cases to avoid even these short periods of contact. Accordingly, in some embodiments, an external supply of pressurised refrigerant vapour is provided that is independent of the operation of the compressor and can be connected to the bearings to supply the pressurised refrigerant vapour to the bearings at low speeds to float the bearings before the rotary speed of the shaft is sufficient to create adequate pressure within the bearings for them to be self-supporting and/or the impeller arrangement of the compressor is able to provide a supply of refrigerant vapour at an adequate pressure to support the shaft in the bearings. The bearings of compressors in accordance with some aspects of the invention may have a vapour feed from an external supply in place of the vapour supply from the impeller wheel discussed above. In some embodiments, the external supply may be continued during normal operation of the compressor (i.e., between start-up and shut-down periods), for example, to provide a flow of vapour to help prevent ingress of dirt to the bearings and/or to cool the bearings if needed. This flow may be intermittent, for example, being switched on (e.g., by operation of an appropriate valve) to provide a flow of vapour to cool the bearings only when an increase in bearing temperature above a predetermined threshold is detected.

The external supply of pressurised vapour may comprise a refrigerant pressurisation vessel that can capture and store pressurised refrigerant vapour from the compressor/refrigeration system when the compressor is running at normal operating speeds. The pressurised refrigerant vapour stored in this vessel can then be utilised to pressurise the bearings during low speed operation of the compressor at shut-down and start-up.

Alternatively or additionally, an external supply of pressurised vapour can be provided when required (e.g., at start-up and/or shut-down) using a vapouriser. The vapouriser heats a liquid refrigerant to generate, preferably only when needed, a saturated or, more preferably, superheated refrigerant vapour that can then be supplied to the bearings. The liquid refrigerant can be taken from the refrigeration circuit of which the compressor is a part or may come from a separate supply. There may be separate vapouriser vessels for use in start-up and shut-down operations or the same vessel(s) may be used for both operations.

In some cases, whether or not an external supply of pressurised refrigerant vapour is used, a period of 'dry running' (i.e., rotation where there is contact between the shaft and the bearing surface) may be desirable at start-up in order to generate some heat in the bearing before the refrigerant vapour is injected. This is because during periods when the compressor is stopped, it is possible that condensation of refrigerant vapour will occur in the bearings. It may be undesirable to run the compressor drive shaft with this type of bearing when liquid refrigerant is present. By dry running for an initial period, the frictional heat generated will cause any liquid in the bearings to evaporate, after which the pure refrigerant vapour can be introduced.

As an alternative or in addition to dry running, one or more of the bearings may have an associated heater element. This heater element can be used to raise the temperature of the bearing components at start-up prior to injection of the refrigerant vapour or to maintain the bearing temperature during vapour injection at shut-down. By raising or maintaining the temperature of the bearings above the saturation temperature of the refrigerant, condensation can be prevented.

Whether heating elements or a period of dry running is used to raise the temperature of the bearing at start-up or shut-down, one or more temperature sensors are preferably provided to sense the temperature of the bearing. A control system can utilise the output from the temperature sensor to determine when the bearing temperature is at or above the saturation temperature of the refrigerant and to subsequently activate the supply of refrigerant vapour from the vapouriser or pressurisation vessel. Similarly, at shut-down, the output from the temperature sensor can be used to control operation of the heating element if needed to maintain the bearing temperature sufficiently high to avoid condensation and liquid formation.

In some embodiments it will be desirable to ensure that the hydrodynamic fluid bearings have been floated (i.e., a vapour film has formed between the opposed bearing surfaces) before the impeller drive shaft is driven to rotate. Especially in the case of hydrodynamic bearings comprising grooves on one or both of the bearing surfaces, it has been found that supply of pressurised vapour from an external source can act on the stationary bearings to apply a rotary force to the inner bearing part relative to the outer bearing part, causing rotation of the impeller drive shaft. This rotation is in the reverse direction compared to the normal operation of the compressor. This rotation will only occur once the bearings have been floated. Thus, by using a sensor to detect this reverse rotation of the shaft, a control system can determine, based on the existence of this rotation, that the bearings have been floated and a signal can be sent to start the drive (e.g., electric motor) for the impeller drive shaft. The pressurised vapour flow to the bearings can then be terminated or reduced.

Alternative means for detecting when the bearings have floated may be used in other embodiments, for example, proximity sensors to sense spacing between the inner and outer bearing parts.

Generally it will be important to ensure that the axial alignment between the shaft and the radial bearings is maintained throughout operation of the compressor, allowing for thermal expansion in use. To help enable alignment of the bearings, they may be mounted to the compressor housing by resilient supports. Suitable resilient supports include resilient diaphragms and O-rings. Particularly where O-rings are used, the resilient support may also usefully provide additional vibration damping to the rotor.

The use of a resilient support for hydrodynamic bearings in a refrigerant compressor is believed to be unique and is seen as beneficial even in cases where the bearing fluid is not the refrigerant vapour itself.

Accordingly, in another aspect the present invention provides a centrifugal compressor for compressing a refrigerant vapour in a refrigeration cycle, the compressor comprising:
  an impeller drive shaft supported by first and second radial bearings for rotation within the compressor housing; and
  an impeller assembly including at least one centrifugal impeller wheel mounted on the impeller drive shaft to rotate with the impeller drive shaft;
  wherein the first and second radial bearings are hydrodynamic bearings and are mounted on the compressor housing by resilient supports.

The bearing fluid may be the refrigerant vapour itself, in accordance with the first aspect above, but it need not be. As noted above, the resilient supports may be resilient diaphragms or O-rings.

In centrifugal compressors of the type with which the present invention is concerned, it is normal to use a thrust bearing, in addition to the radial bearings, to resist lateral movement of the impeller drive shaft in an axial direction, caused by the reactive action of one or more impellers as they create a suction pressure at the inlet eye of the impeller.

In either of the first and second aspects of the invention, the compressor may further comprise a thrust bearing. The thrust bearing may also be a fluid bearing and in preferred embodiments the fluid is the refrigerant vapour itself, as in the radial bearings. Also similarly to the radial bearings in preferred embodiments, the thrust bearings may be hydrostatic, hydrodynamic, or a hybrid combination of the two, taking a supply of pressurised refrigerant vapour from the impeller assembly of the compressor. The supply of pressurised refrigerant may be taken from the same region of the impeller arrangement as that for the radial bearings, or a different region, depending on the specific supply pressure requirements of the bearings in any given installation.

In some embodiments of the various aspects of the invention, the compressor is a multi-stage compressor, comprising a plurality of impellers through which the refrigerant vapour flows in series. The first stage raises the vapour pressure to an intermediate pressure and the second stage then takes the vapour at this intermediate pressure and raises the pressure higher still. In this way, a greater total pressure increase is possible within the single compressor without exceeding acceptable vapour velocities at the impeller outlet or incurring reduced operating efficiency. Generally, a two-stage compressor will be adequate for most applications, but embodiments of the invention may have three or four or more stages, depending on the intended application requirements.

Where two or more impellers are used, at least two of the impellers are preferably oppositely oriented to one another in an axial direction, either with their bladed sides facing one another or their rear sides facing one another. As the impeller inlets are in the centre of their bladed sides, a back-to-back arrangement is favoured (i.e., with rear sides facing one another), so as not to obstruct vapour inlet access to the inlets. By arranging the impellers in this way, the lateral thrust force produced by one impeller counteracts that of the other, reducing the total lateral force on the thrust bearing. There is still likely to be some imbalance overall, however, because the thrust produced by the impeller in the second, higher pressure, stage will typically be greater than that produced by the first stage impeller.

More generally, it is preferable to arrange the impellers such that their reactive forces are self-cancelling, in full, if possible, or in part. Where part thrust cancellation is concerned, a thrust bearing can be designed to support the residual axial thrust. Taking this approach, the thrust bearing load is lower than would be the case with two (or more) impellers arranged in series vapour flow, all oriented in the same direction. For instance, in a three-stage (i.e., three impeller) arrangement, it may be possible to come close to balancing the axial forces by orienting the highest pressure impeller stage in one direction and the other two lower pressure stages in an opposed orientation.

Whilst the impellers in a multi-stage compressor may all be arranged at one end of the impeller drive shaft, it is preferred that they are arranged at both ends. Thus, in a two-stage compressor, it is preferable to have one impeller at either end of the shaft. In a four stage compressor, it will likely be preferable to have two impellers at one end of the shaft and two at the other. This provides a more balanced arrangement. By spacing apart the two (or more) stages, the pipework connection between one stage and the next also provides a convenient location for the introduction of additional refrigerant vapour from an economiser circuit, if present. This pipework connection might also be used for locating an intercooler between the two stages. The intercooling could be through natural heat rejection or liquid refrigerant injection between the impeller stages. This pipework can also accommodate a diffuser arrangement to enhance overall compressor efficiency, as is the case in the present invention.

Some embodiments of the compressor of the present invention can be configured to be used with the impeller drive shaft oriented substantially horizontally, whilst others can be configured to be used with the impeller drive shaft oriented substantially vertically. A vertical orientation has the advantage that the radial bearings carry less axial load and the larger surface area of the thrust bearing results in reduced stresses.

Preferably the compressor housing is designed to prevent liquid refrigerant entering the compressor irrespective of its orientation. The bearing configurations may also be selected to provide a universal design that can be run in either vertical or horizontal orientation depending on the requirements of the specific installation.

In a vertically oriented configuration the impeller wheel(s) are preferably arranged on the shaft so that the net force resulting from the pressure differences across the impeller wheel(s) acts to lift the impeller assembly upwards, relieving (i.e., partially or totally negating) the gravitational weight on a thrust bearing (or thrust bearings) for the shaft and consequent load on the thrust bearing that would otherwise support the whole weight of the shaft, motor and impeller assembly.

In a third aspect, the invention provides a refrigerant compressor for use in a chiller-heater system that can provide chilled water at less than 10° C. and hot water at more than 80° C. without the need for additional heat input, the compressor being configured to provide a compression ratio of at least 18:1 (more preferably at least 19:1 or at least 20:1) and a temperature lift across the compressor of at least 80K (more preferably at least 90K), and the refrigerant being specifically selected to give the desired temperature lift without the pressure at the compressor outlet exceeding 25 bar, more preferably not exceeding 15 bar.

The compressor may be a screw compressor or a scroll compressor. More preferably, however, it is a centrifugal compressor and in particularly preferred embodiments is a two-stage centrifugal compressor, most preferably of oil-free design.

The compressor may be a centrifugal compressor in accordance with one or both of the first and second aspects above, of oil-free design.

In the various aspects of the invention above, the motor may be a permanent magnet electric motor. It may be a rare-earth permanent magnet motor. The motor may be of 2-pole or 4-pole design depending on the desired operating parameters. Alternatively, the motor may be an induction motor, for instance an induction motor of 2-pole or 4-pole design.

Preferably the motor is capable of driving the compressor impeller(s) to at least 10,000 rpm, more preferably 20,000 rpm (and in some embodiments much faster, e.g., 200,000 rpm or 400,000 rpm or more). Electrical power is supplied to the motor through an inverter, which is used to control motor speed and power. The variation in motor speed provides a critically important function in some embodiments, varying the refrigerant mass flow rate through the compressor, thereby varying the cooling capacity (kW), heating capacity (kW) and compression ratio to specifically suit the thermal demands of the refrigeration system it serves.

The motor is preferably mounted within the compressor housing. The motor stator may be mounted in the compressor housing and the rotor of the motor mounted around the impeller drive shaft. In a two-stage compressor, with impellers at either end of the impeller drive shaft, the motor is preferably located within the compressor housing between the two impellers.

The inverter may be mounted on or within the compressor housing. Alternatively it may be physically separate from the compressor assembly. Whilst mounting the inverter on or within the compressor housing has advantages in terms of providing an integrated arrangement, a disadvantage is that it becomes essential and more difficult to cool the inverter. By mounting the inverter physically separately from the compressor there is no cooling load required to prevent the inverter from overheating, this instead occurring naturally with ambient air cooling.

Conveniently, the motor (and/or the inverter if mounted within the compressor housing) can be cooled by the refrigerant on which the compressor is acting. For example, the motor (in particular the motor rotor and inner surface of the motor stator) may be cooled by a flow of refrigerant gas or vapour taken from the impeller assembly. In this case, preferably the motor is cooled by only a portion of the refrigerant liquid or vapour (i.e., not the complete volume/mass flow prior to the compressor, as is known in the prior art) taken from the impeller assembly. Conveniently, the motor can be cooled by the flow of refrigerant vapour that is also supplied to the bearings. The inverter can be cooled in a similar manner by a portion of liquid or vapour refrigerant, or water, if available.

Alternatively, the motor cooling can comprise 'flash cooling' of the external surface of the stator, for example, by passing liquid refrigerant through a channel (e.g., a helical channel) around the stator. The liquid refrigerant in this channel flashes into vapour, thus providing latent cooling whilst removing sensible heat energy from the stator assembly. This approach to cooling the motor has particular advantages, especially when compared to fluid cooling utilising, for example, water, given that waste heat energy from the stator, which is unevenly distributed and at different temperatures on the stator external surfaces, is cooled by this approach at varying rates according to demand (the liquid refrigerant flashes to vapour where the greatest cooling demand occurs). It is also possible to control refrigerant liquid flow rate to the stator to match the stator cooling requirement as the total amount of heat energy rejected by the stator changes with compressor operating parameters and electrical power input.

The cooling liquid for the motor can be provided by a liquid feed tapping from the refrigeration system condenser outlet. The feed can be provided through an expansion device to regulate the liquid flow, for example, according to a pre-set refrigerant superheat value of the vapour leaving the stator cooling jacket. Liquid enters the motor stator cooling jacket, providing flash cooling, distributed according to varying heat emission at different points on the stator surface. In some embodiments, the resulting superheated vapour can then pass through the rotor/stator annulus in order to cool this rotor/stator gap, this vapour flow then being continually drawn into a low pressure point in the compressor such as the first impeller inlet (lowest pressure) stage.

A degree of refrigeration system capacity control can be provided in embodiments of the various aspects of the invention by controlling the motor and impeller speed. This approach is, however, limited. Therefore, for embodiments of the invention where greater capacity control is required for the compressor, variable inlet guide vanes may also be employed at the inlet to the impeller. For multi-stage compressor embodiments of the invention, variable inlet guide vanes may be used for one or more of the impeller compression stages. For instance, in a two-stage compressor, some embodiments may use variable inlet guide vanes only on the first stage and other embodiments may use variable inlet guide vanes for both stages. Conveniently, in embodiments where the impellers of the two stages are arranged at opposite ends of the impeller drive shaft, there is ready access to the inlet sides of both impellers to facilitate the installation and service of variable inlet guide vane modules.

Compressors in accordance with one or more of the aspects above are preferably used in conjunction with a control system. The control system can be implemented in hardware or software or a combination of the two. It may be implemented in a PLC (programmable logic controller) or miniature PC, for example. Preferably the controller operates to control the compressor based on the thermal demands of the refrigeration circuit and/or water chiller or DX system of which it is part. The control system preferably also acts to protect the compressor against out-of-specification operations, to prevent damage to the compressor, where, for example, there is a fault elsewhere in the system that places potentially damaging demands on the compressor.

To assist with fault detection, diagnostics and general performance monitoring, the control system can maintain an event history, i.e., a periodic record of system performance parameters and operating states that can be interrogated at a later date or in real-time. In some embodiments, remote monitoring may be facilitated by integrating the compressor control system with a building management system, for example. Remote monitoring may also be provided by transmitting performance data to a remote monitoring device, for example, wirelessly. Preferably the control system is also able to monitor the state and condition of sensors in the compressor and, optionally, the refrigeration circuit of the refrigeration system of which it is a part. The control system preferably also monitors its own health status and reports accordingly.

It is also preferable to monitor the health of the compressor bearings. Optionally, the control system can do this. The health of the bearings can be monitored, for example, by measuring the absorbed power reading at the inverter. An increase in power reading relative to what is expected for a given operating condition at a specified shaft speed, for example, indicates likely bearing wear or a problem. Additionally or alternatively, bearing condition can be monitored by measuring bearing temperature and/or vibration.

According to another aspect of the invention there is provided a monitoring and control system for a heating ventilation and air-conditioning (HVAC) system comprising: a means for sensing a system variable, a means for determining rotor speed of a compressor, such as a centrifugal compressor, a motor for driving the compressor, a means for measuring mass flow of coolant through the compressor, a microprocessor operating under control of software arranged to modify one or more parameters associated with the compressor so as to optimise efficiency.

System variables include, but are not limited to: ambient temperature, local temperature, coolant properties, desired (target) temperature, actual or desired (target) water temperature, weather conditions and thermal properties of a building.

Parameters associated with the compressor include, but are not limited to: rotor speed (annular velocity), refrigerant mass flow, inlet guide vane angle, compression ratio, power consumption and angle of inclination of the axis of rotation of the compressor to the horizontal.

Further sensor inputs may be provided and monitored by way of a multiple bus data input/output system.

Ideally a transceiver is adapted to relay signals from a monitoring and control system, which is in communication with the microprocessor and/or the means for sensing a system variable, to a remote location.

The transceiver preferably includes a hardwire connection, such as a dedicated network or the Internet and/or a radio communication link, for example, a wireless local area network (LAN), Wi-Fi or Bluetooth (Trade Mark) connection.

Advantages of the monitoring and control system are that it enables a field engineer, systems manager or building manager (caretaker) to monitor and control the performance/output of the system. The monitoring and control system also provides for real time analysis of one or more system variables and/or compressor parameters.

The system, when operated under control of suitable software, is ideally configured to initiate transmission of alerts, alarms and maintenance information to one or more recipients.

Alerts, alarms and maintenance information may be provided by the monitoring and control system in a format in which they are transmitted to dedicated servers and/or receiving devices and/or pagers.

Preferably the monitoring and control system is adapted to transmit a short messaging service (SMS) or text with alerts and/or alarm and/or maintenance information to one or more authorised users, so that, for example, a user-configured mobile communication device (mobile telephone) can be modified to receive the aforementioned alerts and/or alarm and/or maintenance information.

Suitable application specific software is capable of providing a display on a portable electronic device, such as a laptop computer, palm computer, mobile communication device or dedicated communication device. The display is ideally interactive, for example, it is ideally touch sensitive, and presents the user with the opportunity of straightforward and direct communication with a system host or other users.

Ideally the monitoring and control system is adapted for use with the centrifugal compressor and configured to monitor specific variables of the compressor, such as: angular velocity, mass flow rate, vane angle, compression ratio and instantaneous energy consumption.

It is appreciated that one or more suitably authorised users may also make remote checks and inspections of the system and perform routine diagnostic checks and obtain data indicative of other useful system parameters.

A user is optionally able to access a host computer or system microprocessor by way of suitable passwords/authorisation codes so as to change or monitor local conditions. For example, a remote user, using the remote monitor and control system, is able to modify (increase or decrease) local conditions such as temperature in a particular room or building, and/or control or isolate sub-systems within a room or building and/or switch on/off particular coolers, heaters and air-conditioners.

Ideally communication between an authorised user and a supervising computer/microprocessor, operating under control of suitable dedicated software, is performed using an encryption technique so as to ensure secure communication.

BRIEF DESCRIPTION OF THE DRAWINGS

Embodiments of the invention are now described by way of example, with reference to the accompanying drawings in which:

FIGS. 18A, 18B and 18C illustrate an arrangement of conduits for supply of refrigerant vapour from an impeller wheel to bearings or a compressor in accordance with an embodiment of the present invention.

DETAILED DESCRIPTION

Figure 3:
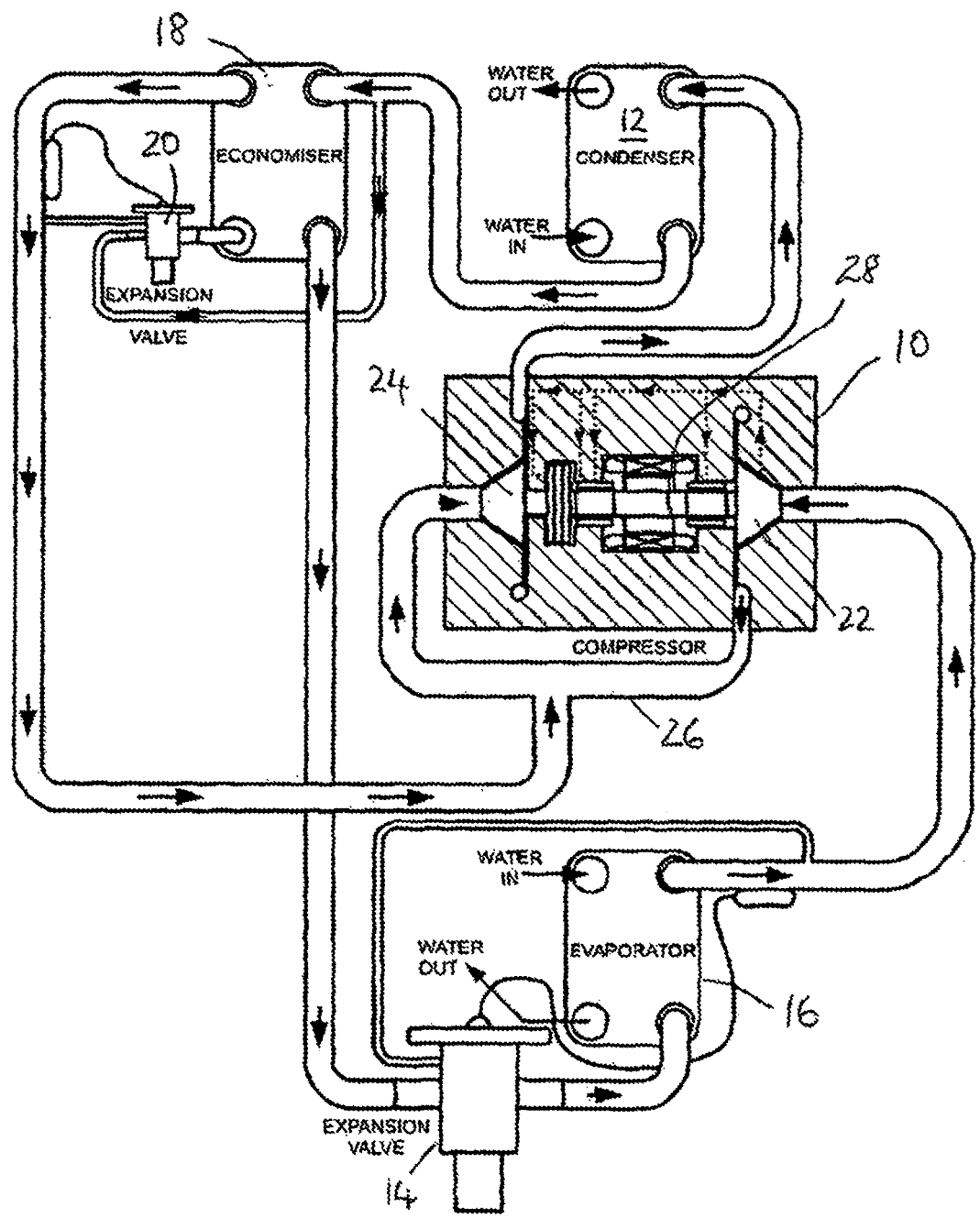
FIG. 3 is a system schematic of a refrigeration circuit in accordance with an embodiment of the present invention.

FIG. 3 shows a refrigeration circuit in accordance with an embodiment of the present invention that might be used, for example, to generate chilled water for a building air conditioning system. In a preferred form, the operating parameters of the system might be designed to provide sufficient heat output to heat a supply of low pressure hot water for the building, in addition to the chilled water for the air conditioning system.

Figure 1:
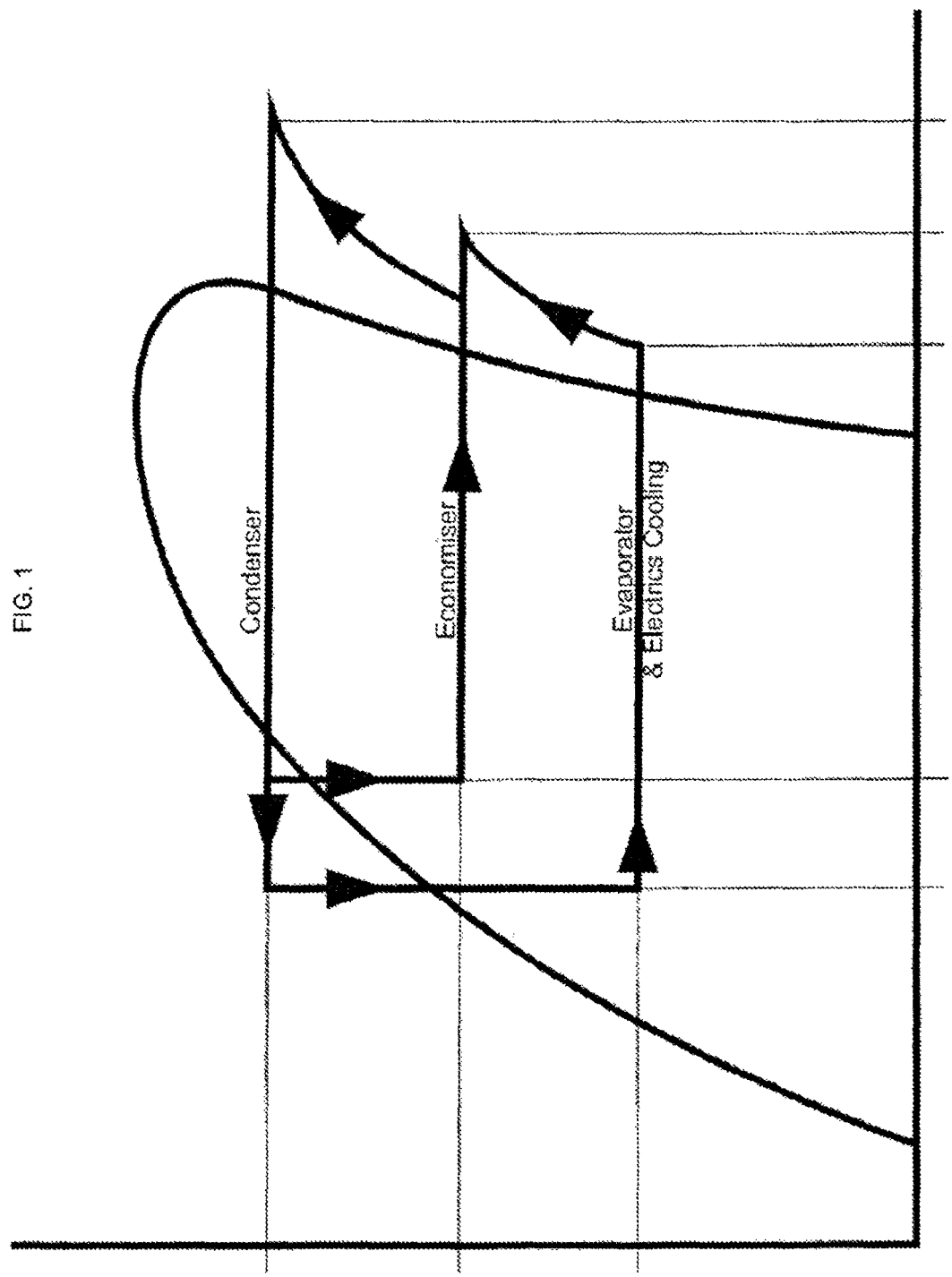
FIG. 1 shows a pressure enthalpy chart for a vapour-compression refrigeration cycle with a two-stage compressor and an economiser circuit.

A refrigerant fluid circulates around the refrigeration system, which operates on a vapour-compression refrigeration cycle (see FIG. 1). The refrigerant enters a two-stage centrifugal compressor 10 in a superheated vapour state and is compressed, in two steps (lower pressure stage 1 and higher pressure stage 2) to a higher pressure and temperature. Superheated refrigerant vapour from the second stage compressor discharge outlet passes to a condenser 12, where it is cooled, the superheat and latent heat of condensation is removed and the vapour condenses to a liquid, then cooling further to a sub-cooled liquid state. The sub-cooled liquid refrigerant output from the condenser is next passed through an expansion device (e.g., expansion valve 14), where it undergoes an abrupt reduction in pressure, resulting in an adiabatic flash evaporation of a proportion of the liquid refrigerant. This dramatically lowers the saturation temperature of the remaining liquid refrigerant, resulting in a liquid and vapour mixture. The refrigerant then passes to an evaporator 16, through which the secondary fluid to be chilled flows (typically water or air). The liquid part of the cold liquid/vapour refrigerant mixture evaporates, and in so doing removes heat energy from the circulating secondary fluid to chill it. The saturated refrigerant vapour absorbs further heat energy to become a superheated refrigerant vapour. From the evaporator outlet the superheated refrigerant vapour then returns to the compressor inlet and the cycle starts again.

In this example, an economiser is used to improve the efficiency of the compressor and the refrigeration system that it serves. A significant portion of the total liquid refrigerant mass flow leaving the condenser 12 enters the primary circuit of the economiser heat exchanger 18 prior to the primary expansion device. The remaining refrigerant liquid enters a second expansion device (e.g., expansion valve 20) and flows through the secondary circuit of the same economiser heat exchanger 18, where it evaporates at a lower saturation temperature than the temperature of the primary liquid refrigerant flow, thus sub-cooling the major portion of refrigerant liquid before it enters the primary expansion device 14.

The economiser secondary outlet superheated vapour flow is re-introduced to the main refrigerant vapour flow between the two impeller compression stages of the compressor 10. The evaporating pressure and temperature within the economiser sits at an intermediate point between the evaporating pressure at the inlet stage of the first stage impeller 22 and the discharge pressure at the outlet of the second stage impeller 24. Conveniently, the pipework 26 connecting the outlet of the first stage 22 to the inlet of the second stage 24 provides an easily accessible location to introduce this economiser refrigerant vapour flow. The economiser flow returning into the compressor intermediate stage performs significant de-superheating of the main flow of refrigerant, improving overall efficiency of the heating/cooling cycle.

Figure 2:
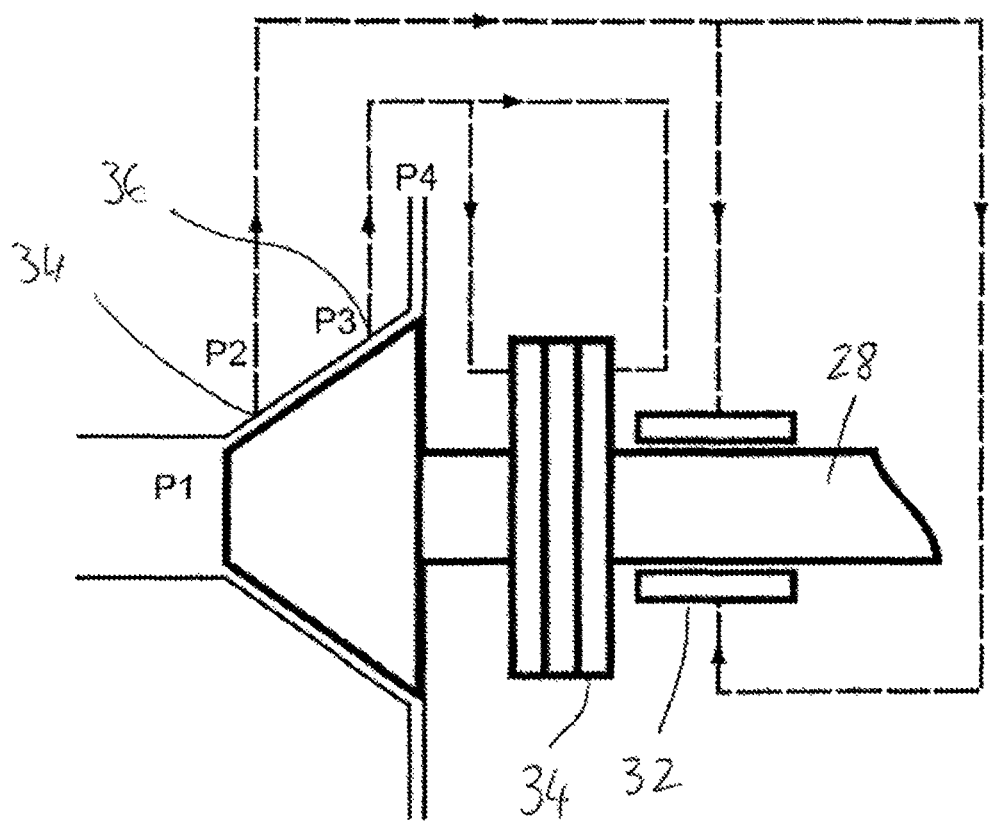
FIG. 2 schematically shows pressure tappings in a centrifugal impeller arrangement to supply a pressurised refrigerant vapour supply to a radial bearing and a thrust bearing in accordance with the first aspect of the present invention.

In accordance with the present invention, as illustrated in FIG. 2, and as discussed further below, the radial bearings 32 and thrust bearings 34 that support and restrain the compressor shaft 28 are hydrodynamic vapour bearings in which the bearing fluid is the circulating refrigerant vapour itself. In the example illustrated here, the refrigerant vapour is taken from tappings 34, 36 in the stage 2 impeller casing and passed through conduits (schematically shown in FIG. 2 with dashed lines) machined in the compressor housing to the bearings 32, 34, to supply vapour to the bearings under pressure. The bearings 32, 34 are therefore a hybrid between hydrostatic and hydrodynamic bearing types, and might conveniently be referred to as "hybrid bearings." In other embodiments the vapour supply for the bearings may be taken from the stage 1 impeller casing, a combination of tappings in the stage 1 and 2 impeller casings, or from an external vapour source. In the example shown in FIG. 2 separate pressure tappings 34, 36 are used for the radial bearing 32 and the thrust bearing 34, in order that the thrust bearing 34 can be supplied with the refrigerant vapour at a higher pressure.

The compressor shown in the exemplary system of FIG. 3, and discussed in greater detail below, is a two-stage compressor, with the impellers 22, 24 for the two stages mounted at opposite ends of the drive shaft 28, the two impellers 22, 24 being oriented in opposite axial directions (back to back) to help minimise the axial thrust forces via self-cancellation. The concepts of the invention can also be applied, however, to other compressor configurations, examples of which are shown in FIGS. 4 to 7.

Figure 4:
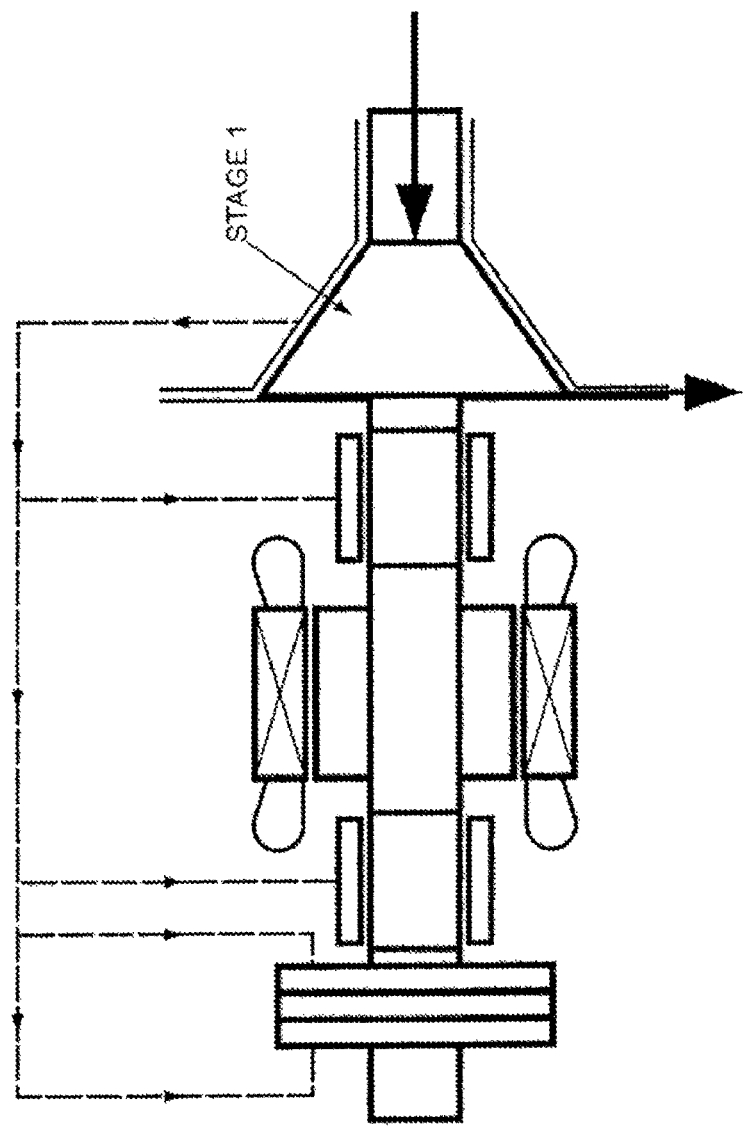
FIGS. 4 to 7 show alternative compressor configurations that can be employed in embodiments of the present invention.
Figure 5:
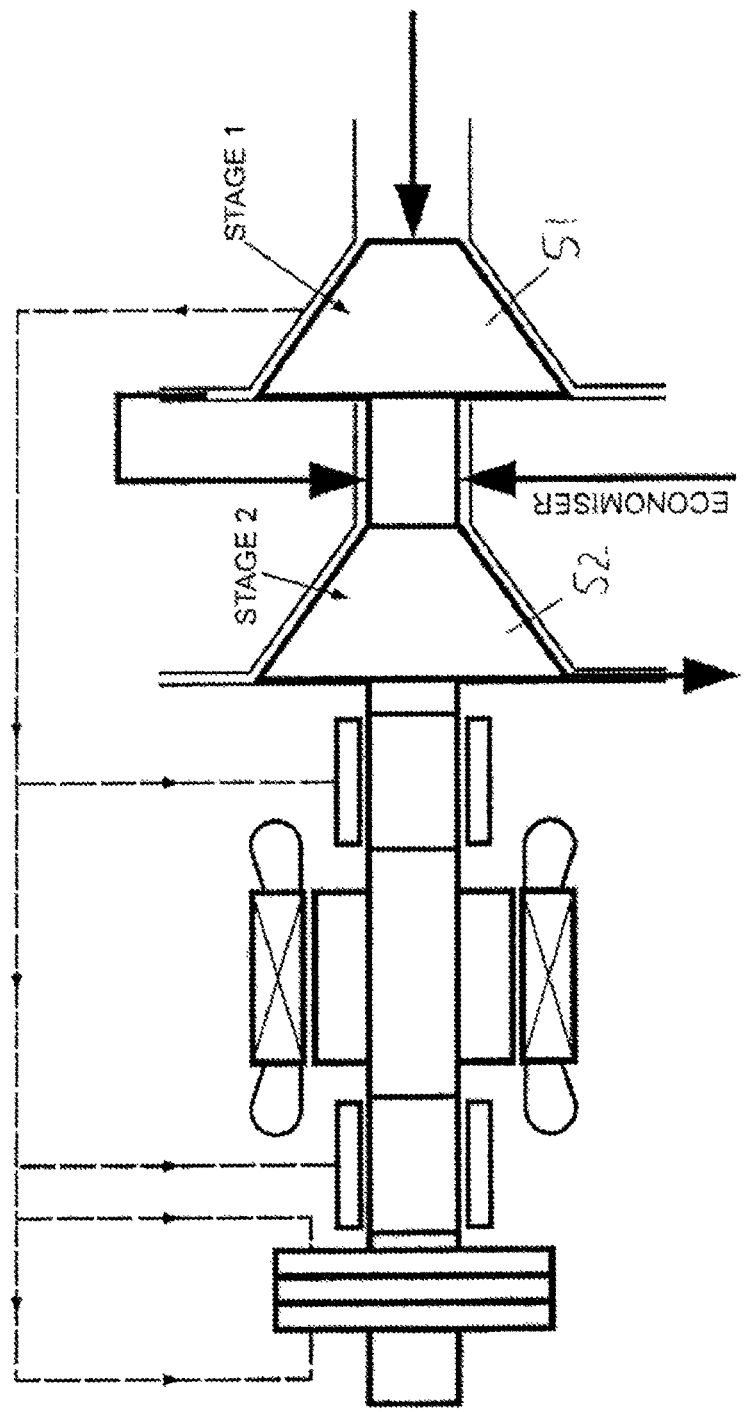
Figure 6:
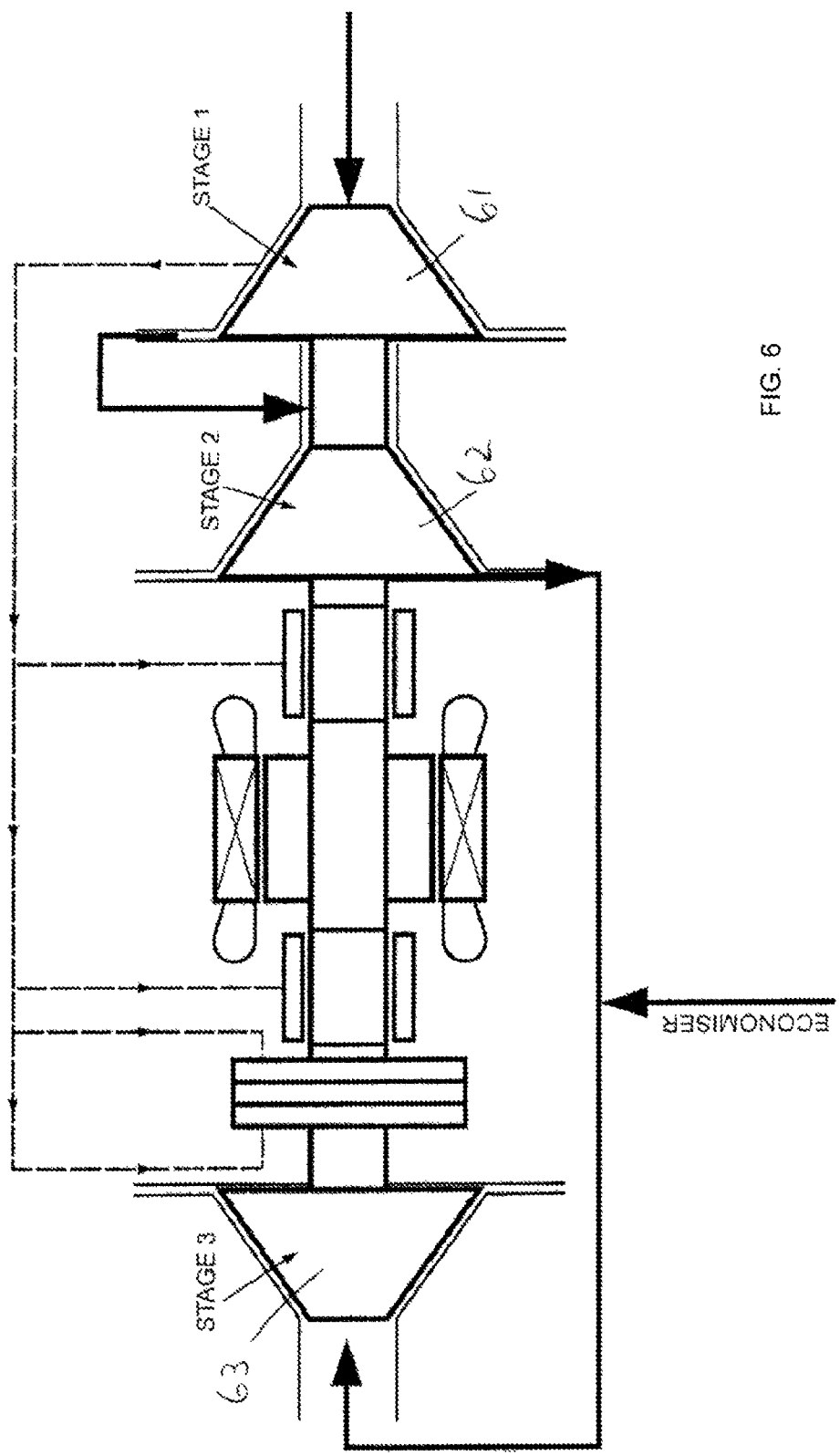
Figure 7:
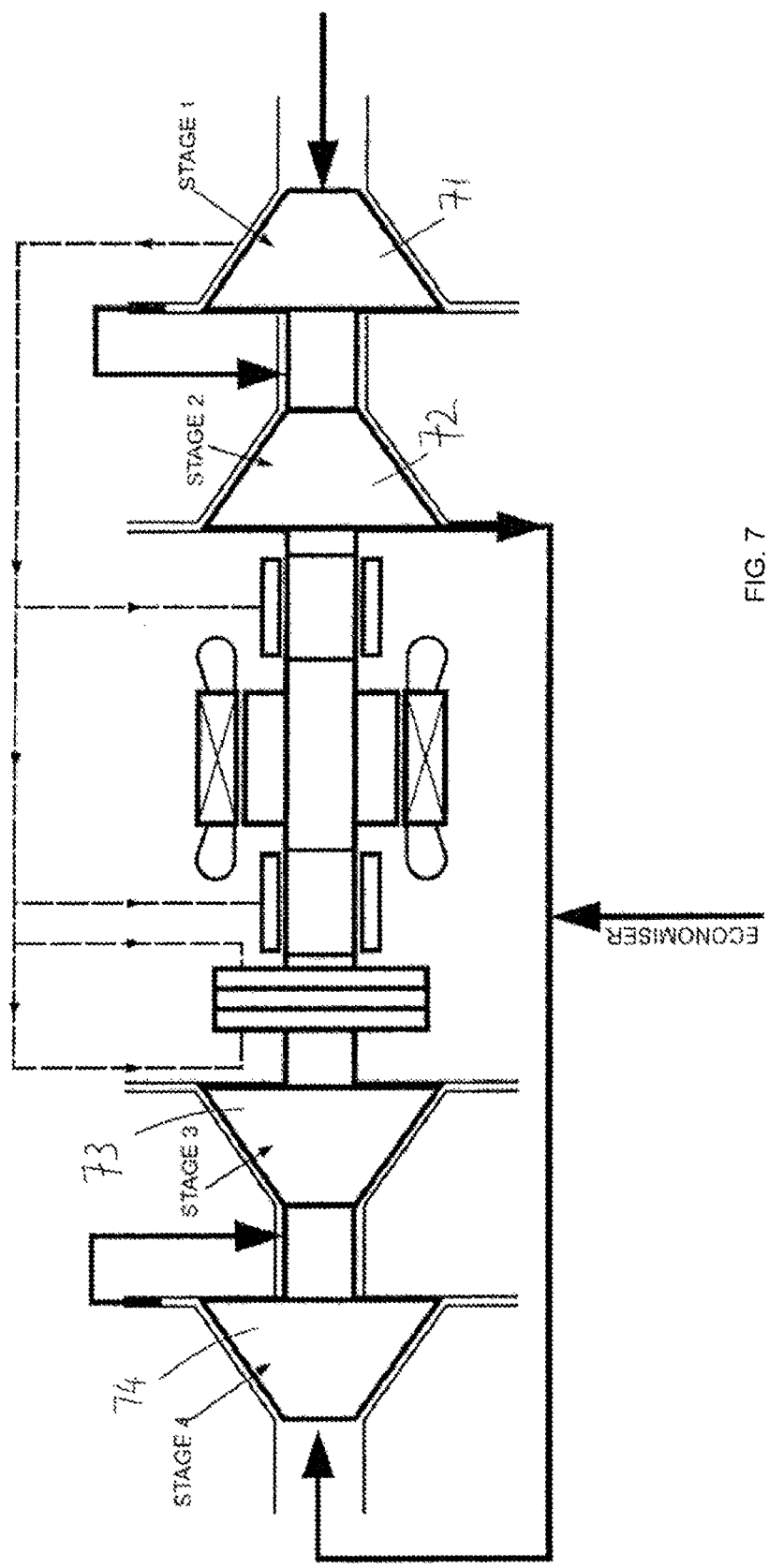

FIG. 4 shows a single-stage configuration. FIG. 5 shows a two-stage configuration with both impellers 51, 52 mounted at the same end of the compressor shaft and axially oriented in the same direction. FIG. 6 shows a three-stage configuration with the stage 1 and 2 impellers 61, 62, 63 at one end of the compressor shaft, facing in the same axial direction, and the stage 3 impeller at the other end of the shaft facing in the opposite direction, so it is back to back with the stage 2 impeller. FIG. 7 shows a four-stage configuration with the stage 1 and 2 impellers 71, 72 at one end of the shaft and the stage 3 and 4 impellers 73, 74 at the other end. The stage 1 and 2 impellers 71, 72 face in the opposite direction to the stage 3 and 4 impellers 73, 74. The skilled person will appreciate that numerous other compressor configurations are possible within the scope of the invention.

Referring again to the system of FIG. 3, as well as the enlarged view of the compressor of that system shown in FIG. 8, the components of the system and some possible variants of the system will now be described in more detail.

Compressor

The compressor is a two-stage centrifugal design with an overall pressure ratio of, in this example, about 19:1. The design point rotational speed was selected at 21000 rpm to give the best compromise between keeping the stage 1 inlet tip relative Mach number to a manageable level (1.3) while minimising the impeller diameters. The compressor is sized to achieve 400 kW of refrigeration, with the incorporation of an economiser circuit. As a result, the second stage compressor is designed for a refrigerant mass flow approximately 50% higher than the first stage. The overall shaft power consumption of the compressor is 224 kW at the maximum flow condition. The resulting heat of rejection of 624 kW in this example can be rejected to atmosphere so usefully employed to heat a secondary fluid (water or air).

Other variants of the compressor, either as a single-stage or multi-stage centrifugal design will operate at lower compression ratios than 19:1. These compression ratios will in some embodiments be in the order of 3:1-5:1 and will be applied to various refrigerants in order to provide the highest operating efficiency. The range of evaporation saturation temperatures and condensing saturation temperatures that in turn define these compression ratios might, for example, be:

Evaporation Saturation Temperature: −5° C., or lower
Condensing Saturation Temperature: 60° C., or higher.

Accordingly, the operational saturation temperatures will render the compressor suitable for use in systems that serve sub-zero refrigeration applications, process cooling, and data centre cooling, comfort and process air conditioning, and numerous other applications.

Moreover, the range of condensing saturation temperatures proposed will permit this compressor design with its attendant technical and efficiency features to be applied not only in Northern Europe, but also in higher temperature regions such as parts of the USA, Japan, Middle East, Far East and Australasia where certain refrigeration and air conditioning systems are unable to function unless the compressor is able to develop a sufficiently high condensing saturation temperature, whilst maintaining the required evaporation saturation temperature at a sufficiently low level.

The compressor includes the following features:

a) Twin centrifugal compressor impellers 22, 24 (sometimes referred to as "wheels") operating in series. For some applications a single impeller may be adequate.

b) "Hybrid" bearings 32, 34 (radial and thrust) which allow the shaft 28 carrying the centrifugal compressor wheels 22, 24 to rotate at very high speeds (circa 60,000 rpm, or as much as 100,000 rpm or even 200,000 rpm or more) without the need for lubricating oil. 99% of the world's Air Conditioning & Refrigeration Systems utilise oil to lubricate the compressors and this oil is inadvertently and unnecessarily transported around the refrigeration system on a continuous basis. This is due to the fact that all compressors continually pump out a proportion of their lubricating oil charge along with the recirculating system refrigerant. This oil impedes the heat transfer efficiency of heat exchangers, consumes a proportion of the compressor's electrical input energy thus reducing overall system efficiency, requires careful sizing of refrigeration pipework to ensure adequate velocities for oil return to the compressor and often requires oil cooling, oil separators, oil pumps, oil heaters, oil level controls and other components to ensure satisfactory operation. The oil free design of the compressor of the present invention thus has a major impact on the efficiency, first cost and ongoing maintenance of such systems.

A key advantage of hybrid bearings over an alternative low friction bearing (magnetic bearings) is that in the event of an electrical power failure, the shaft can simply be allowed to come to rest without the need to provide an auxiliary and temporary power supply, as is the case with magnetic bearings. More importantly, the hybrid type bearings require no electrical energy and therefore this compressor type will be more efficient in this particular regard.

c) Hydrostatic Bearing Vapour Injection—In order to reduce wear and to extend the life of the hydrostatic bearings, the wear that occurs when starting and stopping shaft rotation must be addressed. Consequently, the exemplary system can employ a refrigerant vapour injection system to pass vapour into the bearings in order to "float" the shaft prior to start-up and this will also apply to the thrust hydrostatic bearings. The refrigerant will preferably be finely filtered prior to entering the bearings in order to protect them from system particles/contaminants. The vapour injection system might also be employed to maintain bearing temperatures within reasonable limits, should the minimal friction generated cause unacceptable temperature rise.

d) High Efficiency Motor Design—the majority of compressor drive motors operate at an efficiency of approximately 80%-90% and the waste heat energy is absorbed by the refrigerant vapour passing over the motor windings and then through the compressor mechanism in the majority of AC&R system compressors throughout the world. The motor efficiency envisaged for embodiments of the present invention will preferably be in the order of up to 98.5% and consequently only 1.5% heat rejection will be passed to the refrigerant vapour running over the motor. This results in a smaller condenser, lower condenser secondary fluid flow (typically air or water), smaller fan motors and water pumps resulting in lower electrical power input, and higher overall system efficiency, otherwise known as Coefficient of Performance (COP).

f) Inverter Control—a custom electronic inverter is envisaged to drive the compressor motor at the required speed and to vary the motor speed in order to regulate refrigerant mass flow through the evaporator and refrigeration system in order to match the cooling capacity or heating capacity to the instantaneous cooling or heating load. This results in precision temperature (or evaporating pressure) control and minimises energy consumption. Moreover, when the system is operating at less than maximum speed/mass flow/cooling-heating capacity, the evaporator and Condenser become 'oversized.' This increases their heat exchange capability whilst dramatically improving compressor efficiency and system COP as a result of lower compression ratio demand. Consequently, the increase in system efficiency is exponential at reducing capacity levels. The pressure drop through the expansion device is also reduced under these conditions, thus further improving compressor efficiency and system COP.

The Inverter will preferably also afford the compressor motor protection against the following:
  Over-voltage
  Under-voltage
  Over-current
  Under-current
  Phase-angle
  Phase-failure
  Ground-fault.

g) Typical Compression Ratios—Typical compression ratios in conventional refrigeration and air conditioning systems are in the order of 3:1-5:1 and a wide family of refrigerants is used (in conjunction with suitable mineral or synthetic lubricating oils) to meet the required operating saturation temperature at the evaporator for cooling/refrigeration and at the condenser to suit the secondary fluid temperature (e.g., ambient air or water) into which the refrigeration system heat must be rejected. The range of refrigerants now available is extremely wide and includes HFC's, HFO's, $CO_2$, Air, Hydrocarbons, Ammonia and others. The primary application of the exemplary compressor described here is targeted at a compression ratio of around 20.1:1, this being substantially higher than any prior art Centrifugal compressors.

h) The impellers 22, 24 are mounted on either end of the shaft 28 in a back-to-back arrangement. This has three main benefits:

The axial thrust loads are partially balanced, as the thrust from the first-stage impeller 22 acts in the opposite direction to the second stage impeller 24. This minimises the load on the thrust bearing 34;

Variable inlet guide vanes ('VIGVs') can easily be incorporated in both stages, whereas if the wheels were mounted on the same end of the shaft, it would be virtually impossible to find the space for VIGVs for the second stage; and The mixing of the vapour from the economiser can be easily achieved—complex porting arrangements will not be needed.

Application Temperature Range

The system of FIG. 3 has been initially designed to handle the most arduous temperature range envisaged, that being:
  a) Cooling a secondary medium such as air or water (or another liquid) to a temperature of approximately 5° C., this requiring a refrigerant evaporating temperature and equivalent saturation pressure of about 0° C.
  b) Heating a medium such as air or water (or another liquid) to a temperature of approximately 80° C., this requiring a condensing temperature and equivalent saturation pressure of approximately 90° C.

Many other applications can thus be served by variants of the system, these typically operating between −5° C. (or lower) and 60° C. (or higher) evaporating/condensing temperatures.

Moreover, this compressor can also be applied as a single compressor or as a multiple compressor arrangement such that one or more compressors serve the requirements of the same refrigeration system/circuit, thereby providing a degree of reserve capacity, standby capacity and/or greater flexibility in variable capacity control to match the thermal load requirement. Such compressors can be run singly or mutually, preferably with operating speed and inlet guide vane angle adjustment in harmony so as to ensure both compressors develop the same compression ratio in order to maintain refrigeration system stability. The control and protection system has been designed to suit both single and multiple compressor applications.

Operating Fluids

The Air Conditioning and Refrigeration system industries are served by a wide range of fluids known as Refrigerants. These are specifically selected to suit the application requirements and the equipment is then specifically designed to provide optimal performance with the selected fluid at the required operating parameters. Embodiments of the present invention can be adapted to suit a wide range of application operating parameters and a wide range of operating fluids. These fluids/refrigerants comprise either a single fluid (Azeotrope) or a mixture of 2-3 fluids (Zeotropes) and the following lists some, but not all, of the fluids that embodiments of the invention can be adapted to function with:

Hydrofluorocarbons (HFC's) (and any Blends Thereof)

HFCs are man-made chemicals containing the element fluorine used predominantly as refrigerants and aerosol propellants. They are colourless, odourless and chemically non-reactive gases. They are primarily being used as replacements to ozone damaging CFCs and HCFCs.

These include, for example, but not exclusively:
  R134a
  R23
  R32
  R43
  R125
  R143a
  R152a
  R227ea
  R236fa
  R245fa
  R365mfc
  R407A
  R407C
  R410A
  R507
  R508B
  R437A
  R422D.

Hydrocarbons (HC's) (and any Blends Thereof)

HC's are organic compounds consisting entirely of Hydrogen and Carbon, used predominantly as refrigerants and aerosol propellants. In some cases they are readily absorbed into the lubricating oil, thereby reducing its lubricating properties, potentially leading to compressor failure. Compressors in accordance with embodiments of the invention will surmount this problem by avoiding the use of lubricant oils.

These include, for example, but not exclusively:
  Ethane
  Propane
  Propene
  Butane
  Butene
  IsoButane Pentane
Pentene
Blends of any two or more of the above
HydroFluoro-Olefins (HFO's)
A new family of refrigerants currently undergoing introduction to the industry. (As of 2012/2013).
Other Non-Synthesised Refrigerants (and any Blends Thereof)
Including for example, but not exclusively:
R744 ($CO_2$)
R718 (Water)
R728 (Nitrogen)
R729 (Air)
R740 (Argon).

Applications

Embodiments of the present application are suited to a great variety of different applications including Refrigeration, Air Conditioning and Heat Pump Systems.

Exemplary applications include, for example, but not exclusively:
Water Chillers
DX (Direct Expansion Systems)
Comfort Cooling
Process Cooling (high temperature and medium temperature)
Computer Data Rooms and Data Centres
Low Temperature Refrigeration
Ultra-Low Temperature Refrigeration
Medium Temperature Refrigeration
Supermarket Refrigeration
Cold Rooms
Display Cases
Industrial Automation
Dairy Refrigeration
Close Control Air Conditioning
Pharmaceutical.

The concepts of the present invention can be adapted to operate with alternative fluids by simply varying physical size/shape/properties of the following components:
Centrifugal compressor Wheels
Inlet Guide Vanes
Lateral/Journal hydrostatic/hybrid bearings
Thrust hydrostatic/hybrid bearings
Motor rating (kW) and speed (rpm)
Wheel Housing and Inlet Guide Vane Housing
Inverter power (kW) and speed/frequency (Hz)
Control and Protection System.

System Control

Figure 8:
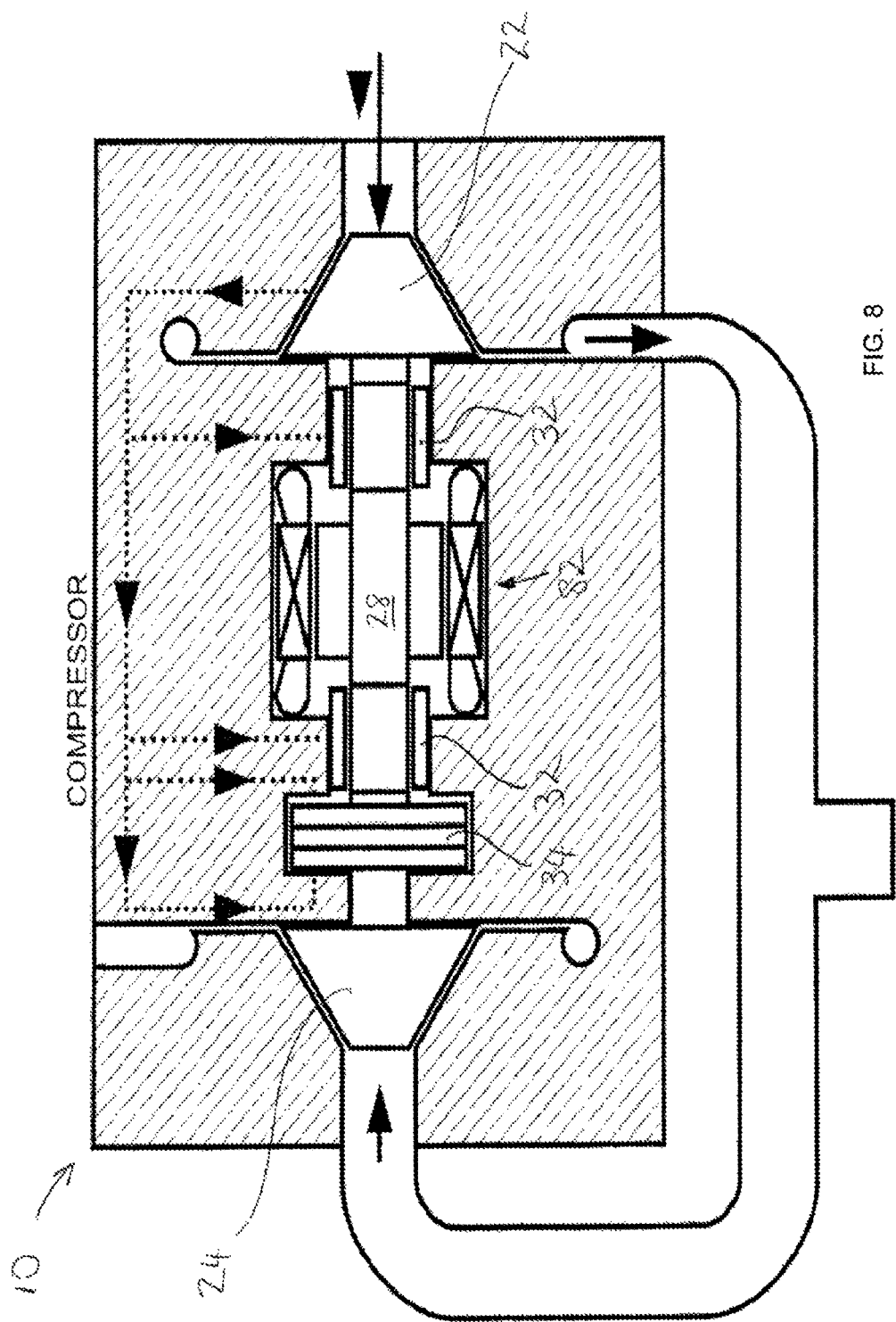
FIG. 8 is a schematic sectional view through the compressor of the system of FIG. 3.
Figure 9:
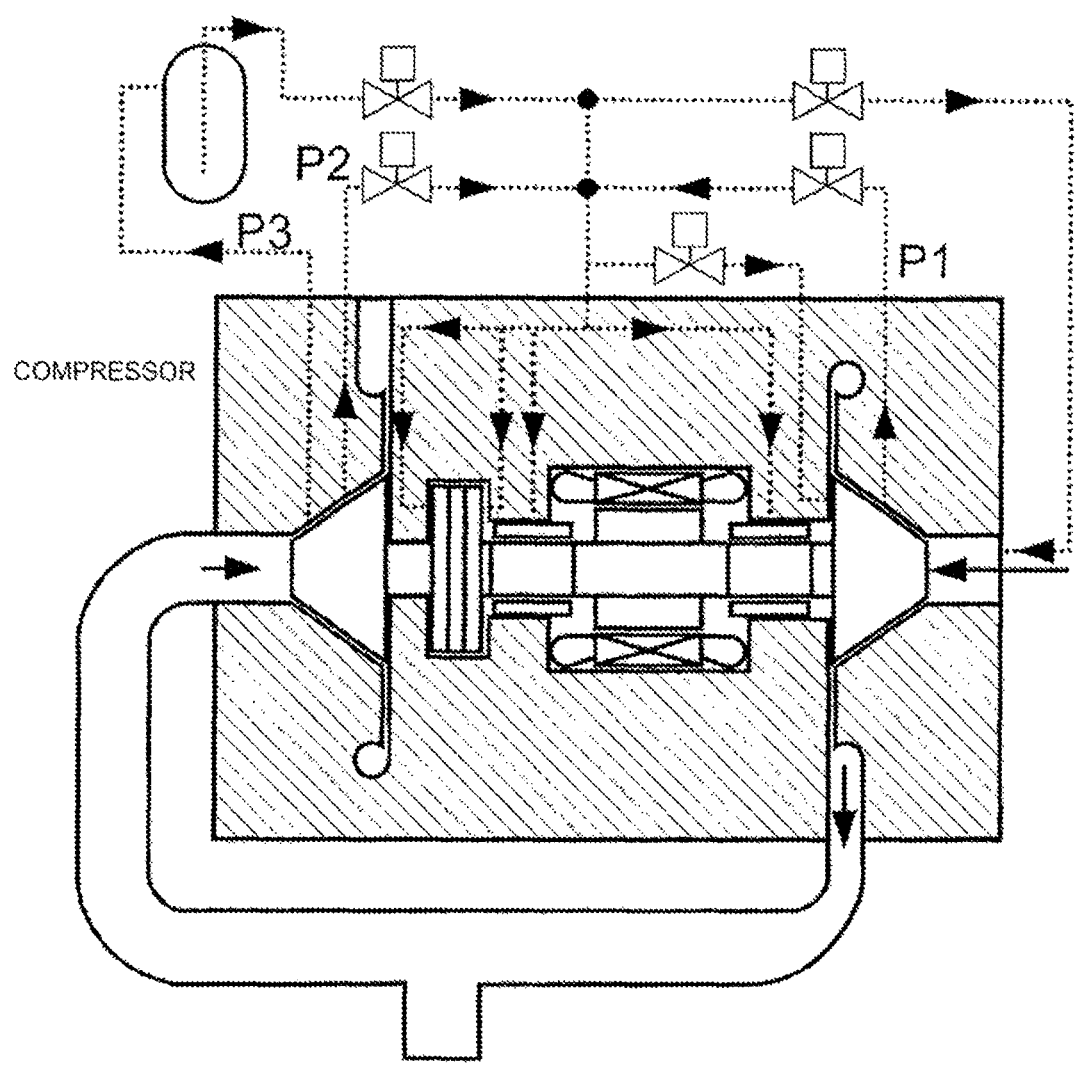
FIG. 9 is a sectional view of the compressor of FIG. 8 showing more detail of the refrigerant vapour supply tappings to the lateral and thrust bearings.
Figure 10:
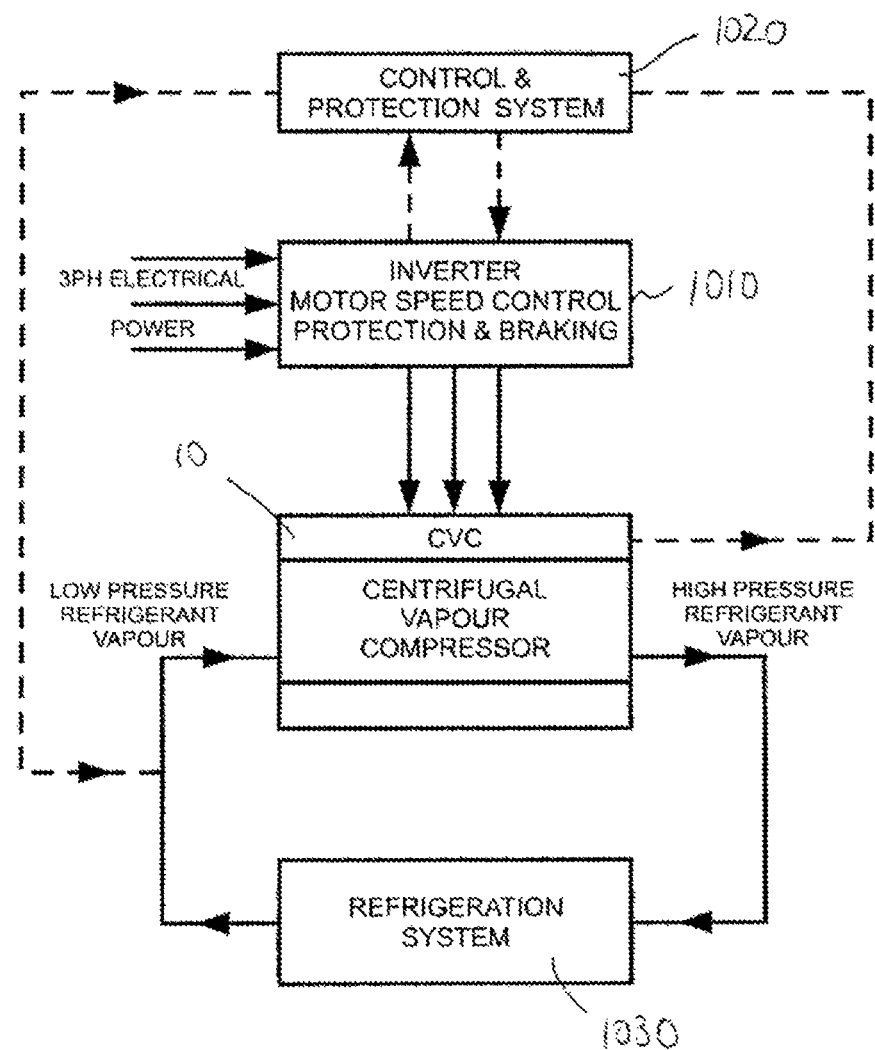
FIG. 10 is a schematic block diagram of the system of FIG. 3, including a control and protection system and motor speed controller (power inverter)

As shown in FIG. 10, the electronic inverter 1010 is used to speed control and protect the motor 82 (FIG. 8). In addition, however, a control and protection system 1020 is provided for the compressor 10. This can also control and protect the refrigeration system 1030 as a whole.

The control system will typically have inputs of system pressures, temperatures and power input. It may, for example, control one or any two or more of: motor speed, inlet guide vane angle, the thermostatic expansion valves (that admit refrigerant to the evaporator and economiser of the refrigeration circuit), and condenser fan speed (where the condenser rejects heat to atmosphere and fans are used to assist) to maintain the compressor within desired operating parameter ranges and preferably also to maximise system efficiency and thermal performance. The expansion valves may also be controlled to help protect the compressor from the entry of liquid refrigerant.

One possible approach to enhanced control and protection is to use a variant of the commercially available ClimaCheck™ system. The ClimaCheck™ system is conventionally used to analyse system performance using existing system pressure, temperature and power input sensors (and can be used in this manner in embodiments of the present invention whether or not it is used as part of the system control). The ClimaCheck™ technology enables the performance of an Air Conditioning or Refrigeration System to be analysed to within an accuracy of 5-7% of reality. The following parameters can be determined on a dynamic basis at 1 s, 2 s, 5 s, 10 s, 30 s, 60 s and 5 minute intervals and may be made available to an operator instantaneously or recorded for future interrogation:
Cooling Capacity (kW)
Heating Capacity (kW)
Power Input (kW)
Heat of Rejection (kW)
Evaporating Temperature
Condensing Temperature
Sub-Cooling
Superheat
Coefficient of Performance (System COP in Cooling and Heating Modes)
Isentropic Efficiency of compressor
Running Cost
$CO_2$ Emissions and Indirect Global Warming Potential
Mass Flow Rate of Secondary Flow at Evaporator
Mass Flow Rate of Secondary Flow at Condenser.

ClimaCheck™ also gives advance warning of refrigerant loss, unstable system operation, and operation outside of safe system limits. Emails/text messages can be automatically sent to various recipients under such circumstances. Business Edge Limited is the distributor of ClimaCheck™ throughout the UK. The core PLC (Programmable Logic Controller) that resides within ClimaCheck™ can also be programmed to become a control and protection device and can also reside on the same Network as ClimaCheck™. Consequently, the readings derived from Temperature and Pressure Sensors, Current Transformers and so on can be utilised both for ClimaCheck™ Performance Analysis and for the "Control and Protection" of the compressor and refrigeration system.

Separation Vessel

Figure 11:
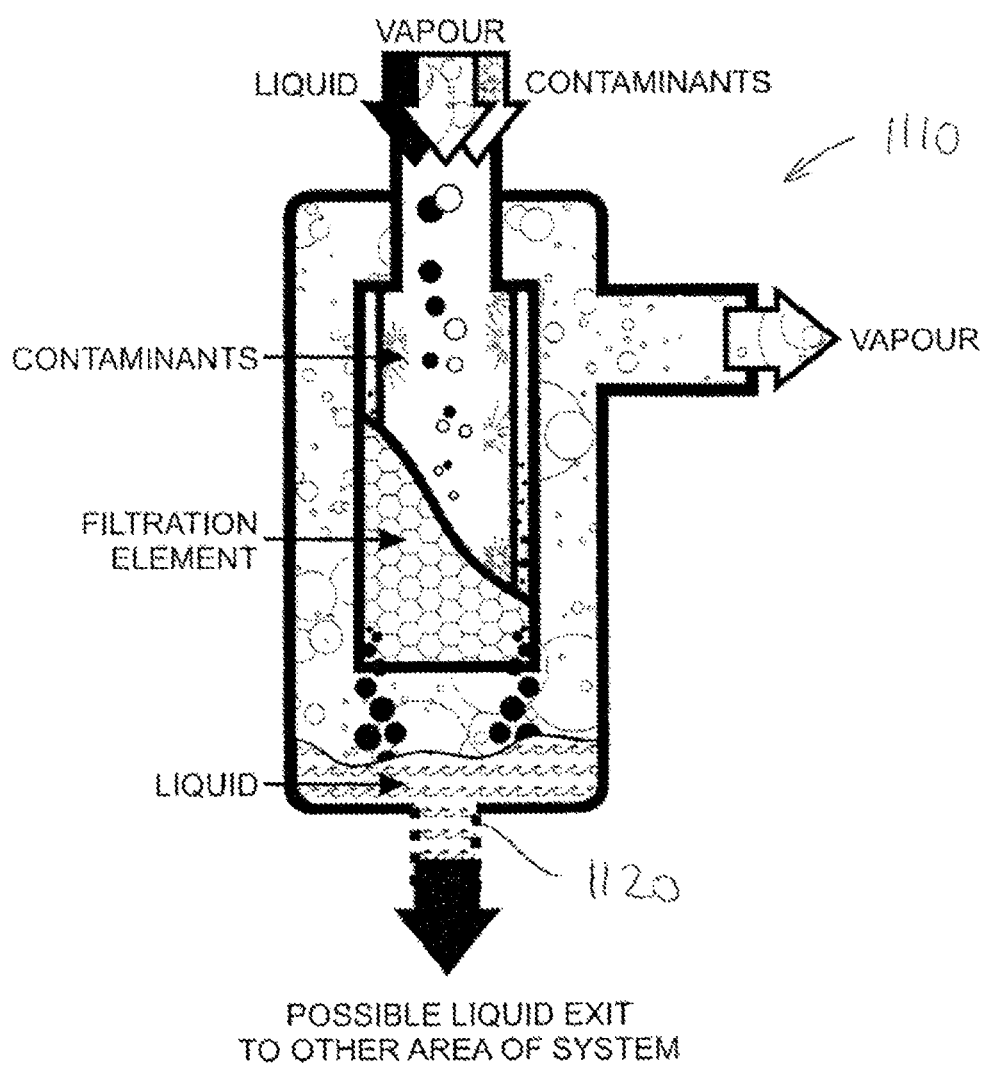
FIG. 11 is a schematic sectional view of a separation vessel that can be used at the inlet to the compressor of some embodiments of the present invention.

In some embodiments it may be desirable to use a separation vessel in the system prior to the compressor inlet. An example of such a vessel, which might be termed a "Suction Accumulator/Filter Vessel," is shown in FIG. 11.

The main purpose of this vessel 1110 is to act as an emergency reservoir upstream of the compressor 10 so as to trap any liquid "slug" that might develop in the suction line leading to the compressor 10. This, for example, might arise where the expansion valve 14 controlling the flow of liquid refrigerant into the evaporator 16 malfunctions or if such a valve 14 is incorrectly set with too low a superheat value.

Another application for this vessel 1110 is where the compressor might be utilised within a heat pump system—when such systems reverse cycle, excess liquid can often be directed towards the compressor 10. Here the combined suction accumulator/filter 1110 will provide sufficient volume to receive such slugs of liquid. When this occurs, the compressor 10 continues to run drawing vapour only from the vessel 1110 so as to protect the centrifugal wheels 22, 24 of the compressor, whilst progressively evaporating the liquid into vapour form prior to the compression process.

In such an arrangement, the compressor and the system in which it is contained might employ use of a bottom connection 1120 at the base of the suction accumulator so as to allow any liquid accumulation to be directed elsewhere, either for re-use within the system or for other purposes directly related to the function of the compressor.

A secondary function of the suction accumulator/filter vessel 1110 is to provide a high degree of filtration at the inlet to the compressor 10. Where any particulate matter within the refrigeration system might exist or might develop either as a result of component malfunction or as a result of poor system maintenance or installation, the high grade filter will ensure that pure vapour only passes into the inlet of the first stage centrifugal wheel 22 of the compressor so as to protect the wheels 22, 24 and the journal/thrust plate assemblies 32, 34.

In a further application of the Suction Accumulator/Filter Vessel, the vapour flows from the compressor hybrid bearings and/or vapour from other parts of the refrigeration system can be connected to this component so as to act as a "vapour collection point" to both protect the first stage impeller from any liquid present in these vapour lines and to arrest any particulate matter that would otherwise enter the compressor, thus avoiding both impeller and bearing damage.

Magnetic Suction Accumulator

Where any particulate matter containing iron is concerned, a magnetic capture device could be included within pipework or within a suction accumulator/filter vessel upstream of the compressor of the present invention or indeed any type of compressor. The incidence of such iron-containing particulate matter is likely to be very low in the refrigeration circuit; however, any ferrous materials that might be within the system itself at the outset of construction could be captured in this way.

Remote Monitoring & Control System

Figure 12:
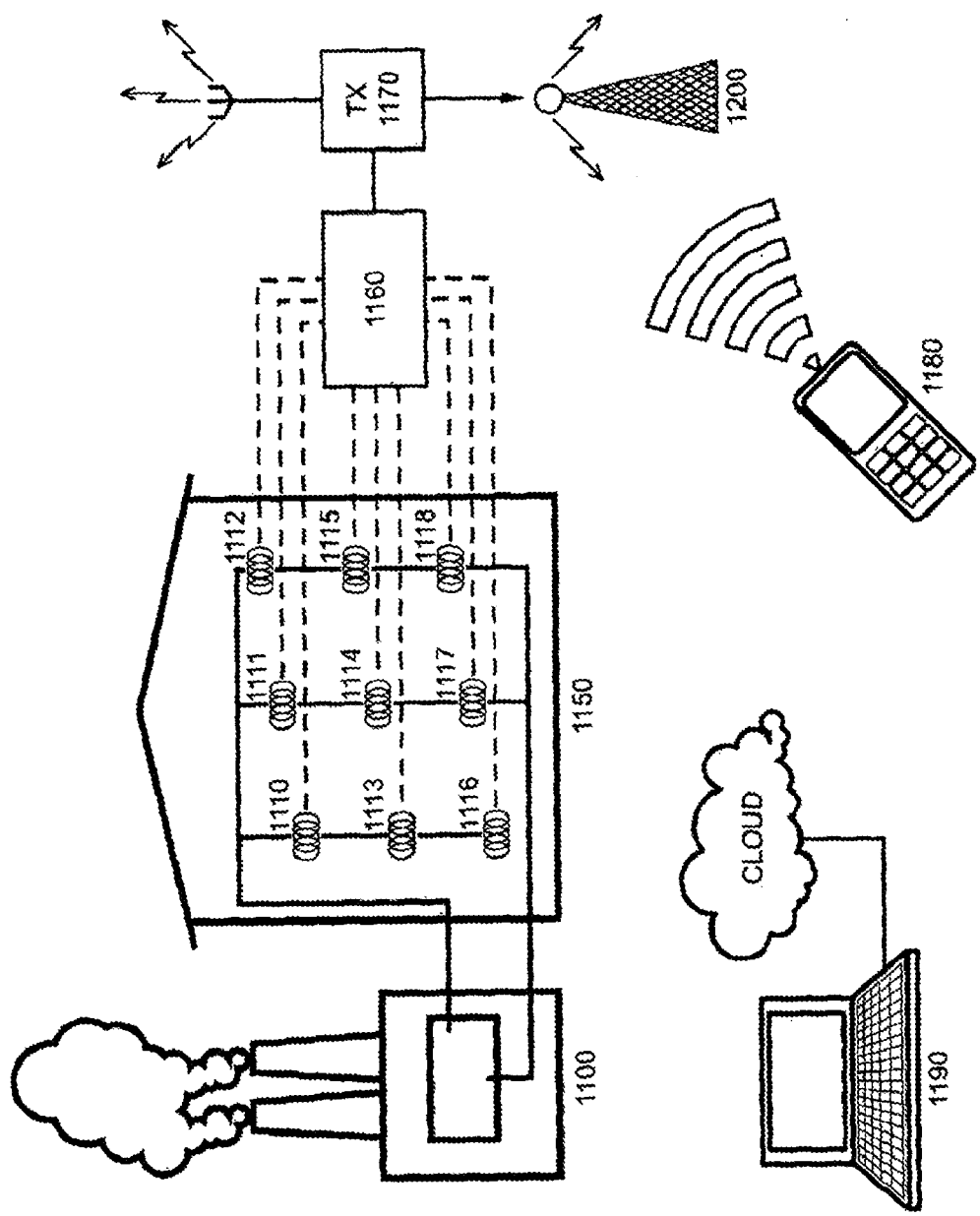
FIG. 12 is an overall view of an example of a control and monitoring system for use with one embodiment of the compressor.
Figure 13:
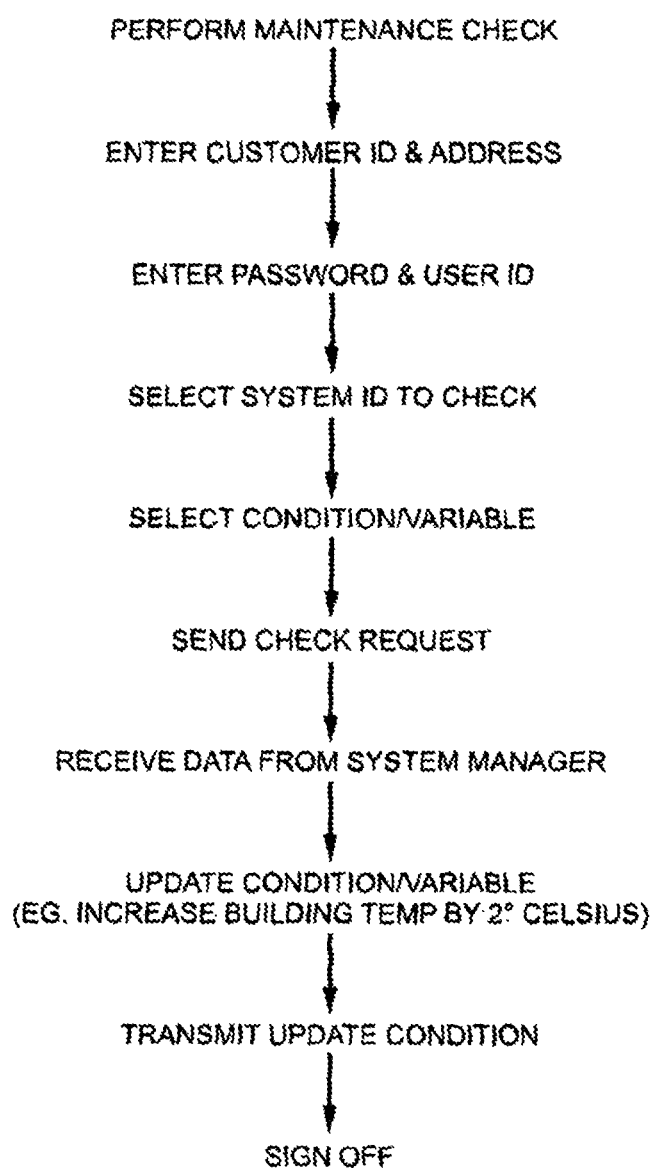
FIG. 13 is an example of a flow diagram for use with the system in FIG. 12.

Referring briefly to FIGS. 12 and 13, there is shown a diagrammatic overview of a remote monitoring and control system for overseeing an HVAC system 1100 which includes a compressor, as described above. Sensors 1110-1118 are typically located about building 1150 and might measure local room temperature or external (ambient) temperature. Each sensor 1110-1118 provides an input into control system 1160, such as the one that is sold under the ClimaCheck™ brand, and which includes a microprocessor 1160 operating under control of proprietary software (optionally modified by a user) and bespoke algorithms.

A transceiver 1170 is connected to the microprocessor 1160 and is adapted to communicate to mobile communication devices 1180, via 'GPS' systems, as well as to conventional fixed computer terminals 1190, for example, via the Internet (Cloud) or conventional telecommunication networks.

Referring briefly to FIG. 13 there is shown a flow diagram of typical menus that are provided to a Maintenance Engineer in order to verify the status or update the condition of an air-conditioning unit or water heater/chiller (not shown) into which a temperature signal is provided automatically from the sensors 1110-1118. In response to a request or in order to perform a check, a user has to enter certain location specific data, passwords and authentication data (such as user ID codes) in order to be able to gain access to one of several controllable systems, via a data link. These systems range from a local scale, such as the temperature of a room or floor of building 1150, to a larger scale, such as start-up of an entire water treatment plant or HVAC system for an entire building or complex of buildings, for example, a shopping mall or office block.

Once access to the system controller has been gained, and subject to safety overrides and other failsafe systems, a user inputs desired updates or new temperature conditions and these are translated into commands to local valves or to the compressor. An acknowledgement of the command or new setting is transmitted from the transceiver 1170 at the control system and confirms receipt of the instruction and updating of particular conditions/parameters.

Compressor Operational Cycle

Figure 14:
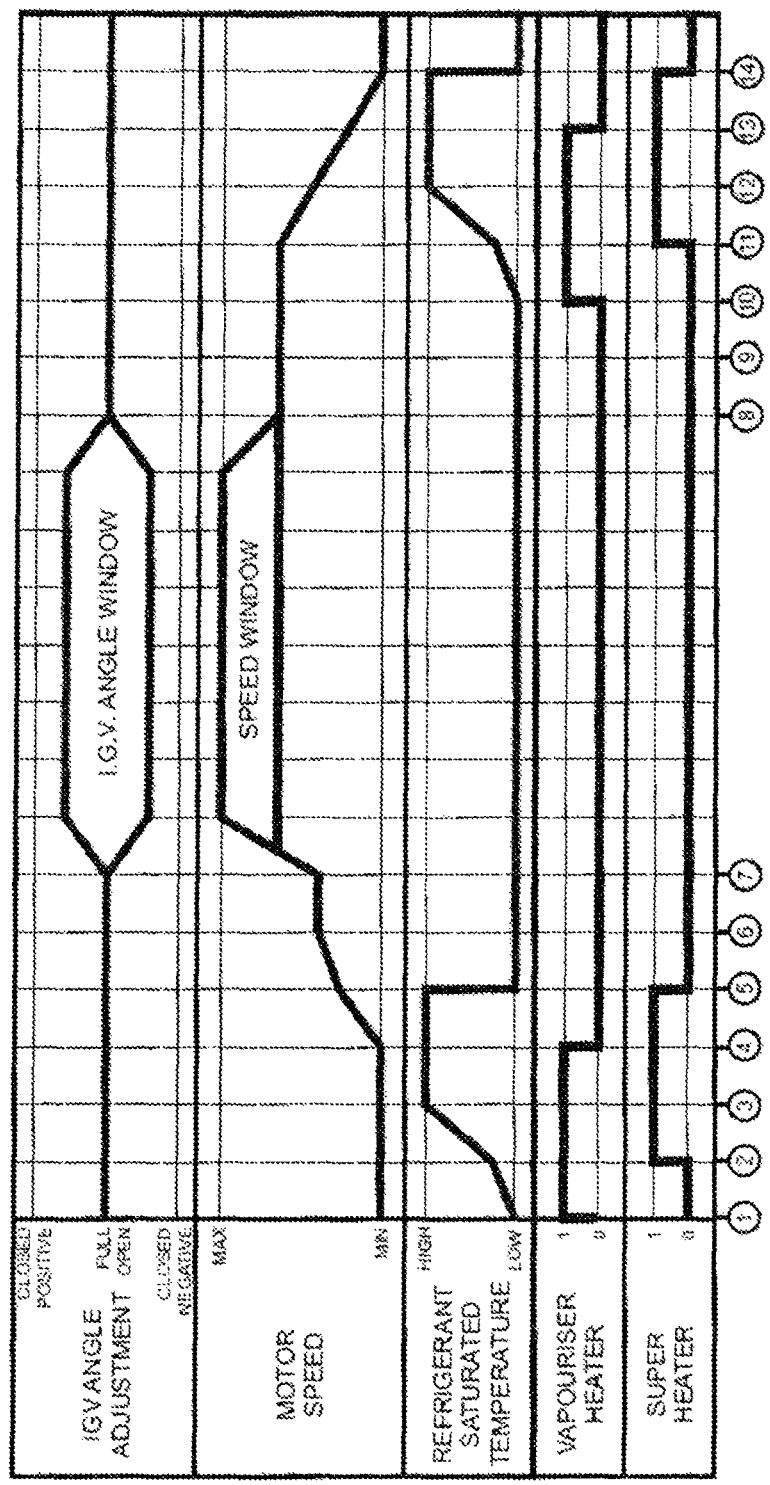
FIG. 14 illustrates an exemplary operating cycle for a compressor in accordance with an embodiment of the present invention.

FIG. 14 illustrates an exemplary operating cycle for a compressor system in accordance with an embodiment of the present invention. In this example, the system includes a vapouriser arrangement for supplying the hybrid bearings of the compressor with refrigerant vapour at start-up and shut-down to float the bearings at times when the rotational speed of the impeller drive shaft is not fast enough for the hydrodynamic bearings to be self-supporting. As discussed in more detail below, in this example the vapouriser arrangement has a vapouriser chamber for generating saturated vapour and a superheat chamber for superheating the saturated vapour prior to it being fed to the bearings.

The cycle will be described with reference to the operating points labelled in the figure with numbers in circles:

1. A "Start" command in response to control system instruction "vapouriser energised." At this point the vapouriser chamber is generating saturated vapour.
2. Superheater energised—the saturated vapour from the vapouriser chamber is superheated in the superheat chamber.
3. Superheated vapour injection to journal/thrust bearings to float these bearings.
4. Once the bearings are floated, the drive motor starts and accelerates centrifugal vapour compressor wheels to "pre-set speed" at which the bearings are self-sustaining (self-acting spool for hybrid bearings). Pressure from one or more tapping points on one or more impeller wheels is also available at this operating point to provide additional support to the journal/thrust bearings.
5. Vapouriser/superheated vapour supply shut-down.

5-8 Vapouriser recharged with liquid refrigerant in readiness for next operation.

6. Drive motor accelerating to "operating speed window."

7-8 Adjusting speed within this range to control refrigerant mass flow developed by impeller wheels of compressor in order to attain setpoint target of refrigeration system by matching refrigeration capacity to instantaneous thermal load. VIGV angle is also adjusted at one or more centrifugal wheel inlets in conjunction with impeller wheel speed, to attain fine refrigerant mass flow control but at peak operating efficiency, whilst avoiding "surge" or "choke" conditions.

8. "Stop command" in response to control system instruction.
9. Vapouriser energised.
10. Superheater energised.
11. Superheated vapour injection to journal/thrust bearings to support bearings as impeller speed drops below speed at which bearings are self-sustaining.
12. Drive motor decelerating to "pre-set speed" (self-supporting) (pressure from impellers no longer able to supply bearings).
13. Drive motor is stopped.
14. Superheated vapour supply to journal/thrust bearings is stopped.

Vapouriser Configurations

Figure 15:
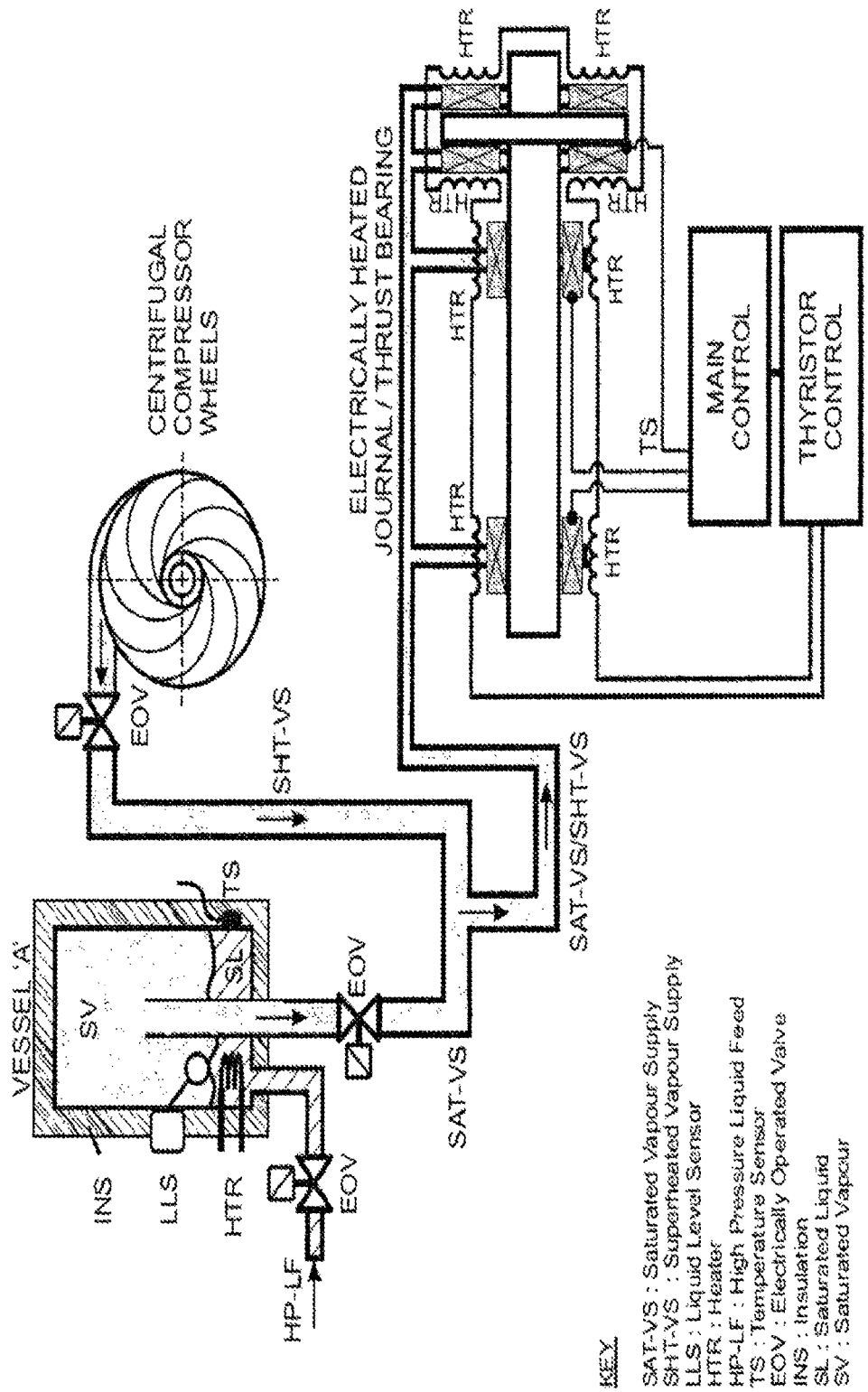
FIGS. 15 to 17 show schematically three possible configurations for a vapouriser arrangement that can be used to supply refrigerant vapour to the fluid bearings of an embodiment of the present invention, for example, at start-up and/or shut-down.
Figure 16:
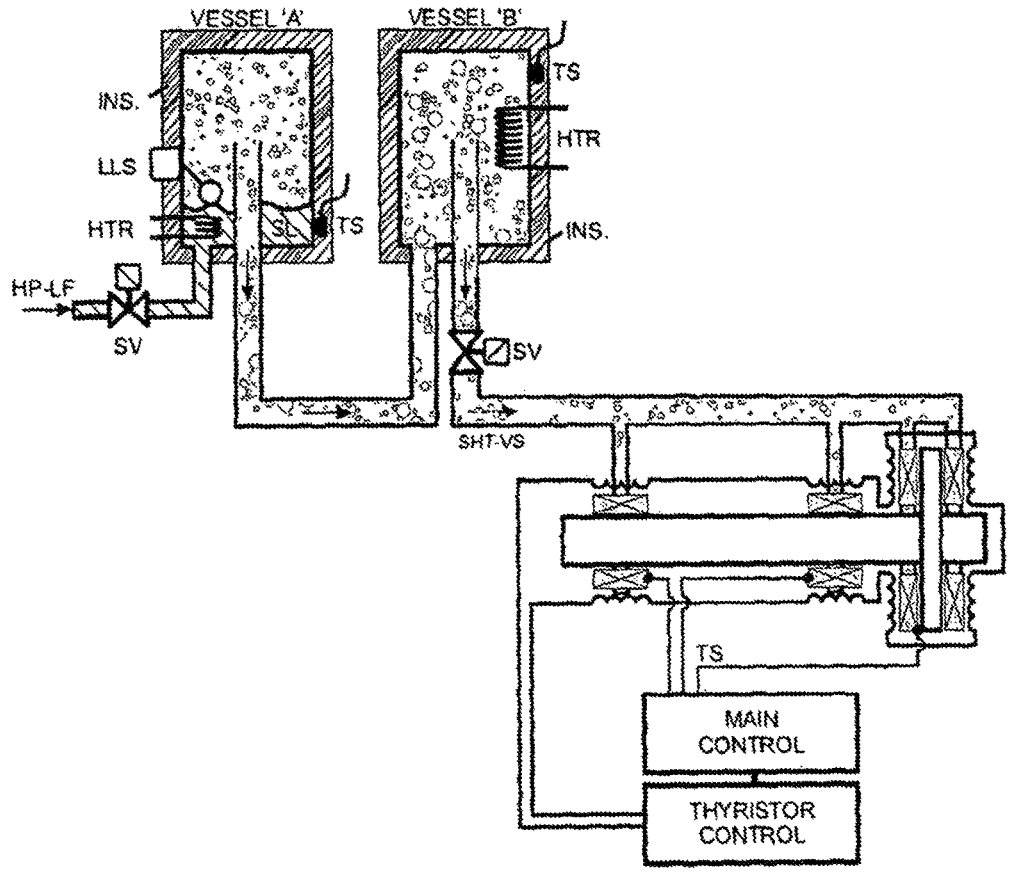
Figure 17:
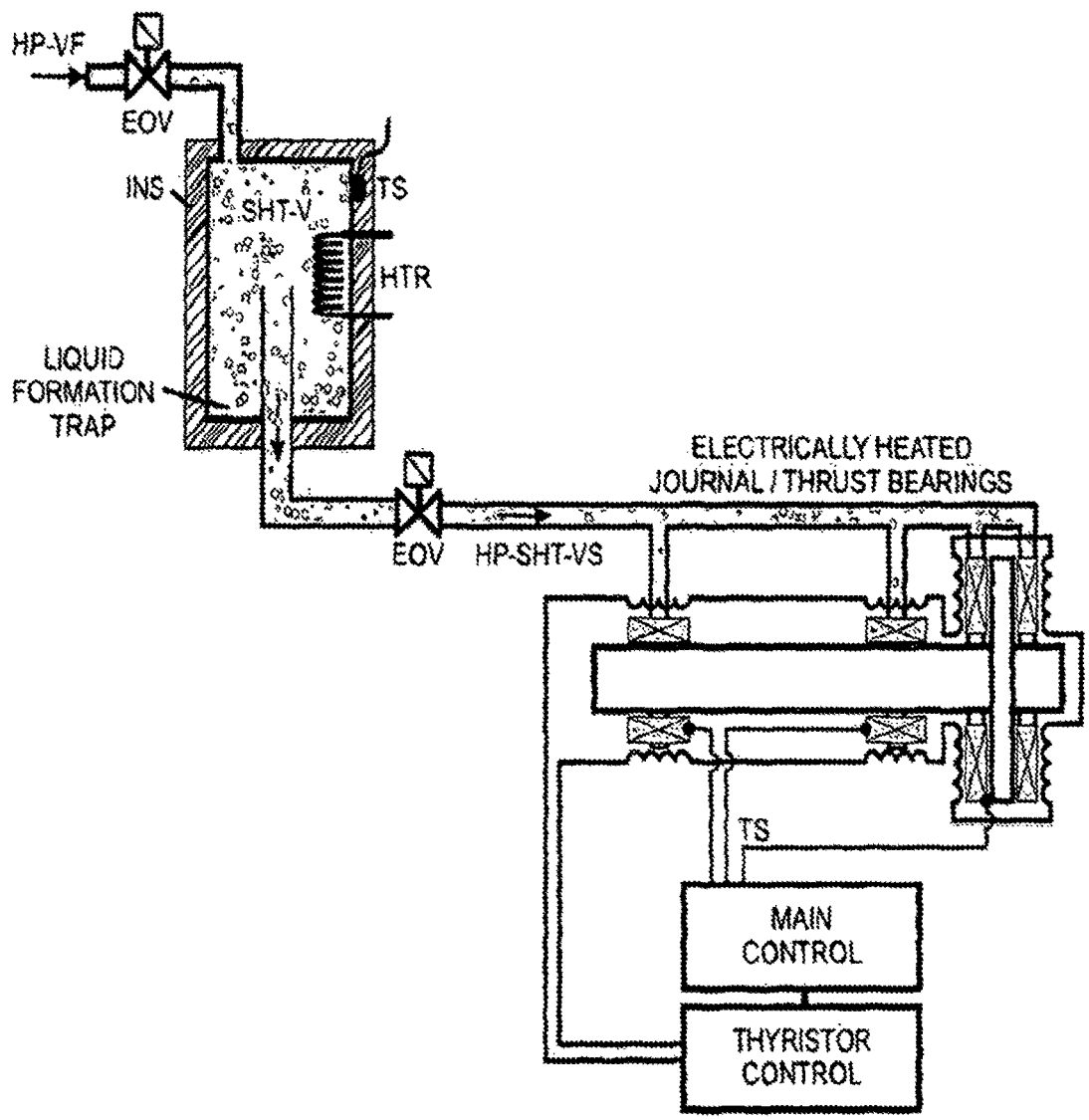

FIGS. 15 to 17 show exemplary possible configurations for a vapouriser arrangement that can be used, as in the exemplary operation cycle discussed above, to provide a supply of refrigerant vapour to float the radial and/or thrust bearings at slow speeds, for example, during start-up and shut-down, especially at times where the rotational speed of the impeller drive shaft is insufficient for the bearings to be self-supporting.

In the arrangement seen in FIG. 15, liquid refrigerant in a vapourisation chamber ("vessel 'A'") can be rapidly heated by a heater ('HTR') in the chamber to generate saturated vapour ('SV') at an elevated pressure. This vapour is then fed, under its own pressure, to the radial and thrust bearings of the compressor through vapour supply channels ('SAT-VS/SHT-VS').

The opening of the vapour outlet within the vapourisation chamber is elevated above the base of the chamber to ensure that no liquid refrigerant can flow into the vapour supply channels. The level of the liquid refrigerant in the chamber is monitored with a liquid level sensor ('LLS'), a supply of liquid refrigerant to the chamber being controlled, in response to the liquid level sensor output, using an electrically operated valve ('EOV').

Further electrically operated valves ('EOV') are used to open and close the vapour flow from the chamber to the bearings and also to open and close a flow of vapour from one or more of the impellers of the compressor to the bearings.

In this example, heaters ('HTR') are associated with each bearing to elevate the temperature of the bearing above the saturation temperature of the refrigerant to prevent potentially damaging condensation forming in the bearings. The heaters are driven in this example by thyristor control. Temperature sensors ('TS') are used to sense bearing temperature, the signals from these sensors being used by the main control system to control the bearing heaters and to control the switching on of the vapour supply from the vapouriser at start-up.

In the vapouriser arrangement illustrated in FIG. 15, during start-up and shut-down the bearings are fed with a supply of saturated vapour from the vapouriser chamber. It may be more preferable, however, to feed superheated vapour to the bearings as this further reduces the likelihood of the vapour condensing in the bearings. FIG. 16 shows a vapouriser arrangement to achieve this, in which saturated vapour from the vapourisation chamber ("Vessel 'A'") is supplied to a superheating chamber ("Vessel 'B'"), in which it is superheated by further heater ('HTR') in this second vessel. A temperature sensor ('TS') in the superheat chamber is used to control the heater to ensure the vapour leaves for onward passage to the bearings in a superheated state.

FIG. 17 shows a further example of a possible arrangement for providing the bearings with a supply of vapour. In this example, rather than the vapouriser chamber having a liquid refrigerant feed, it is instead supplied with refrigerant vapour from a high pressure region of the refrigerant circuit (e.g., compressor outlet) during operation of the compressor. The vapour is then stored in the chamber until required to float the bearings, e.g., at shut-down, at which point it is further superheated and elevated in pressure by a heater ('HTR') in the chamber and fed to the bearings.

Bearing Vapour Feed

FIG. 18 shows, for a compressor in accordance with an embodiment of the invention, one example for a configuration of channels formed in the compressor housing through which refrigerant vapour can be supplied from one or more impeller wheels of the compressor, or from a vapouriser arrangement, to the radial and thrust bearings of the compressor. FIG. 18A is a longitudinal cross section through one end of the compressor. FIG. 18B is a sectional view along line A-A in FIG. 18A and FIG. 18C is a sectional view along line B-B in FIG. 18A.

Looking first at the feed to the radial bearing, vapour passes from a supply (i.e., impeller or vapouriser) through a radial bore in the compressor housing to an annular channel that surrounds the outer bearing shell of the radial bearing. A series of radial drillings extend through the outer bearing shell to extend from this annular channel to the inner bearing surface of the outer bearing shell, so that vapour flows under pressure from the annular channel through these drillings into the gap between the bearing surfaces of the inner and outer bearing shells. The vapour is then discharged to either end of the bearing gap. The arrows in FIGS. 18A and 18C indicate the vapour flow through the bearings.

The same radial supply bore supplies refrigerant vapour to both sides of the thrust bearing via passages that branch off the radial bore. More specifically, these passages supply vapour to drillings that are circumferentially spaced at intervals around the thrust plates on either side of the thrust bearing at the end of the impeller drive shaft. The arrows in FIGS. 18A and 18B indicate the flow of vapour through the bearing.

While the invention has been described in conjunction with the exemplary embodiment described above, many equivalent modifications and variations will be apparent to those skilled in the art when given this disclosure. Accordingly, the exemplary embodiment of the invention set forth above is considered to be illustrative and not limiting. Various changes to the described embodiment may be made without departing from the spirit and scope of the invention.

The invention claimed is:

1. A centrifugal compressor for compressing a refrigerant vapour in a refrigeration cycle, the compressor comprising:
   an impeller drive shaft supported by first and second radial bearings for rotation within the compressor housing; and
   an impeller assembly including at least one centrifugal impeller wheel mounted on the impeller drive shaft to rotate with the impeller drive shaft;
   wherein the first and second radial bearings are hydrodynamic fluid bearings in which the bearing fluid is the refrigerant vapour, the compressor further comprising a conduit for supplying a portion of the refrigerant vapour from the impeller assembly to the first and second fluid bearings,
   an external supply of pressurised vapour comprising a refrigerant pressurisation vessel that is adapted to capture and store pressurised refrigerant vapour from the compressor or a refrigeration system of which the compressor is a part when the compressor is running at normal operating speeds.

2. The centrifugal compressor according to claim 1, comprising:
   a refrigerant vapour feed taken from two or more regions of the impeller wheel or wheels of the impeller assembly, including a relatively low pressure region and a relatively high pressure region; and
   wherein the compressor further comprises a valve arrangement for selectively connecting either the higher pressure region or the lower pressure region of the impeller wheel(s) to the conduit that supplies refrigerant vapour to the radial bearings.

3. The centrifugal compressor according to claim 1, wherein the external supply of pressurised refrigerant vapour that is independent of the operation of the compressor and is adapted to be connected to the bearings to supply pressurised refrigerant vapour to the bearings at low speeds to float the bearings.

4. The centrifugal vapour compressor according to claim 3, comprising a sensor for detecting whether or not the bearings are floated.

5. The centrifugal vapour compressor according to claim 4, wherein the sensor is a sensor to detect reverse rotation of the impeller drive shaft.

6. The centrifugal compressor according to claim 1, wherein the bearings are mounted to the compressor housing by resilient supports.

7. The centrifugal compressor according to claim 6, wherein the resilient supports are resilient diaphragms or O-rings.

8. The centrifugal compressor according to claim 1, further comprising a thrust bearing.

9. The centrifugal compressor according to claim 8, wherein the thrust bearing is a fluid bearing in which the fluid is the refrigerant vapour itself.

10. The centrifugal compressor according to claim 9, wherein the thrust bearings are from the group comprising: hydrostatic and hydrodynamic and a hybrid combination of hydrostatic and hydrodynamic, adapted to receive a supply of pressurised refrigerant vapour from the impeller assembly of the compressor.

11. The centrifugal compressor according to claim 10, wherein the supply of pressurised refrigerant is taken from the same region of the impeller arrangement as that for the radial bearings.

12. The centrifugal compressor according to claim 10, wherein the supply of pressurised refrigerant is taken from a different region of the impeller arrangement as that for the radial bearings.

13. The centrifugal compressor according to claim 1, wherein the compressor is a multi-stage compressor, comprising a plurality of impellers through which the refrigerant vapour flows in series.

14. The centrifugal compressor according to claim 13, wherein at least two of the impellers are oppositely oriented to one another in an axial direction, either with their bladed sides facing one another or their rear sides facing one another.

15. The centrifugal compressor according to claim 13, wherein the impellers are arranged at either end of the impeller drive shaft.

16. The centrifugal compressor according to claim 1, configured to operate with the impeller drive shaft oriented substantially vertically.

17. The centrifugal compressor according to claim 16, wherein the impeller wheel or wheels are arranged on the impeller drive shaft so that the net force resulting from the pressure difference(s) across the impeller wheel(s) acts to lift the impeller and shaft/motor assembly upwards.

18. The compressor according to claim 1, wherein the compressor is driven by a permanent magnet electric motor.

19. The compressor according to claim 1, wherein the compressor is driven by an induction motor.

20. The compressor according to claim 18, wherein the motor is mounted within the compressor housing.

21. The compressor according to claim 20, wherein the motor is cooled by a portion of the flow of refrigerant vapour from the compressor.

22. The compressor according to claim 20, wherein the motor stator is flash cooled by a liquid refrigerant feed.

23. The compressor according to claim 18, wherein the motor is controlled by an inverter mounted on the compressor housing.

24. The compressor according to claim 1, comprising variable inlet guide vanes at the inlet to the impeller or in multi-stage compressors at the inlet of one or more of the impeller compression stages.

25. A centrifugal compressor for compressing a refrigerant vapour in a refrigeration cycle, the compressor comprising:
an impeller drive shaft supported by first and second radial bearings for rotation within the compressor housing, wherein the first and second radial bearings are hydrodynamic fluid bearings in which the bearing fluid is the refrigerant vapour;
an impeller assembly including at least one centrifugal impeller wheel mounted on the impeller drive shaft to rotate with the impeller drive shaft; and
an external supply of pressurised refrigerant vapour that is independent of the operation of the compressor and is adapted to be connected to the bearings to supply pressurised refrigerant vapour to the bearings, wherein the external supply of pressurised vapour comprises a refrigerant pressurisation vessel that is adapted to capture and store pressurised refrigerant vapour from the compressor or a refrigeration system of which the compressor is a part when the compressor is running at normal operating speeds.

26. The centrifugal compressor according to claim 25, wherein the external supply of pressurised vapour comprises a refrigerant pressurisation vessel that is adapted to capture and store pressurised refrigerant vapour from the compressor or a refrigeration system of which the compressor is a part when the compressor is running at normal operating speeds.

27. The compressor system, comprising a compressor according to claim 1 and a control system to monitor, control and protect the compressor.

28. The compressor system, comprising a plurality of compressors according to claim 1 serving a single refrigeration circuit and a control system to monitor, control and protect the compressors.

29. The compressor system according to claim 27, wherein the control system maintains an event history.

30. A refrigeration circuit comprising the one or more compressors according to claim 1 and a control system to monitor, control, and protect the compressor.

31. A chilled water system comprising the refrigeration circuit according to claim 30.

32. A Direction Expansion (DX) refrigeration system, comprising the refrigeration circuit according to claim 30 serving one or more evaporators.

33. An industrial process cooling system, comprising the refrigeration circuit according to claim 30.

34. A building air conditioning system, comprising the Chilled Water System or DX System according to claim 30.

* * * * *